United States Patent [19]
Tsuji et al.

[11] Patent Number: 5,671,456
[45] Date of Patent: Sep. 23, 1997

[54] SYSTEM FOR PROVIDING AN ACCURATE INDICATION WHETHER FILM IS EXPOSED OR UNEXPOSED, INDEPENDENT OF BATTERY VOLTAGE

[75] Inventors: Kenji Tsuji, Kashiwara; Toshihito Kido, Matsubara; Satoshi Hamada, Sakai, all of Japan

[73] Assignee: Minolta Camera Kabushiki Kaisha, Osaka, Japan

[21] Appl. No.: 400,516

[22] Filed: Mar. 7, 1995

Related U.S. Application Data

[63] Continuation of Ser. No. 53,591, Apr. 28, 1993, abandoned.

[30] Foreign Application Priority Data

May 8, 1992 [JP] Japan ............ 4-116290
May 8, 1992 [JP] Japan ............ 4-116385
May 8, 1992 [JP] Japan ............ 4-116391

[51] Int. Cl.$^6$ ..................... G03B 1/18
[52] U.S. Cl. ..................... 396/392; 396/410
[58] Field of Search ............ 354/173.1, 173.11, 354/21, 214, 217, 275, 484; 396/387, 389, 392, 406, 410

[56] References Cited

U.S. PATENT DOCUMENTS

| | | | |
|---|---|---|---|
| 4,412,164 | 10/1983 | Ohnuma | 318/596 |
| 4,431,292 | 2/1984 | Takashi | 354/173.11 |
| 4,613,224 | 9/1986 | Ogasawara | 354/402 |
| 4,734,732 | 3/1988 | Nishio et al. | 354/173.11 |
| 4,935,765 | 6/1990 | Ishida et al. | 354/402 |
| 4,958,175 | 9/1990 | Asakura et al. | 354/173.1 |
| 5,032,854 | 7/1991 | Smart et al. | 354/21 |

FOREIGN PATENT DOCUMENTS 4-76526  3/1992  Japan.

*Primary Examiner*—Safet Metjahic
*Assistant Examiner*—J. K. Han
*Attorney, Agent, or Firm*—Burns, Doane, Swecker & Mathis, LLP

[57] ABSTRACT

A microcomputer provided in a camera body uses a data signal read by sensors facing the data disk of a film cartridge as a positional signal to set the stop position of the spool for providing exposed/unexposed indication to the film. The voltage of the power supply of the camera is detected to modulate a pulse duration by which the number of rotations of the motor can be kept constant in rewinding the film. The sensors are disposed upstream in the rotational direction of the data disk by a certain angle θ with respect to the point at which the spool is stopped in order to prevent the dislocation between the display mark of the cartridge and the pointing mark of the data disk. The microcomputer discriminates whether or not data has been read. The mechanism for feeding the film is controlled to set the film at a predetermined position after the decision that the data has been read.

16 Claims, 38 Drawing Sheets

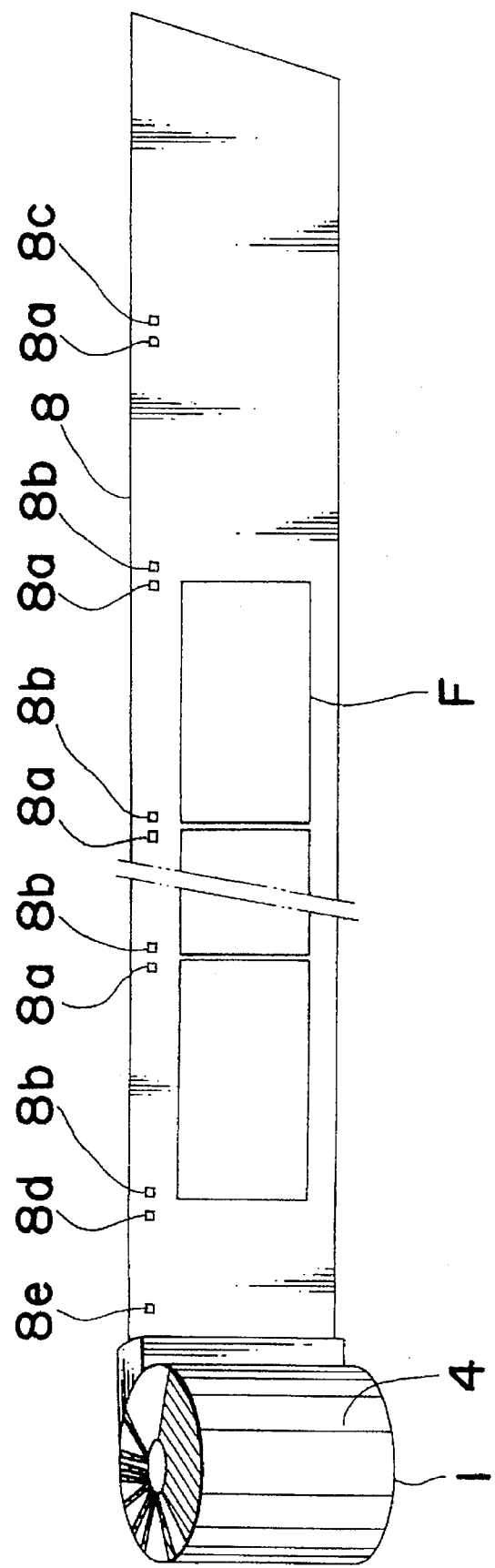

DETECTION SIGNAL P1 OUTPUTTED FROM PR1

DETECTION SIGNAL P2 OUTPUTTED FROM PR2

DETECTION SIGNAL P1 OUTPUTTED FROM PR1

DETECTION SIGNAL P2 OUTPUTTED FROM PR2

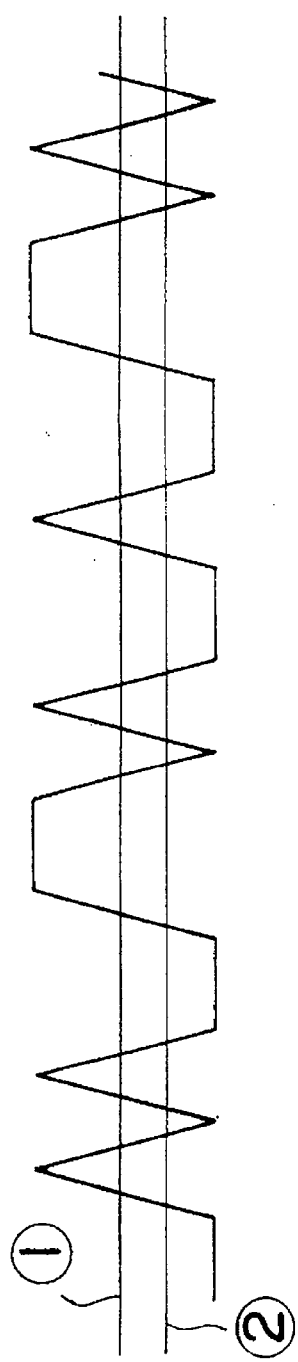
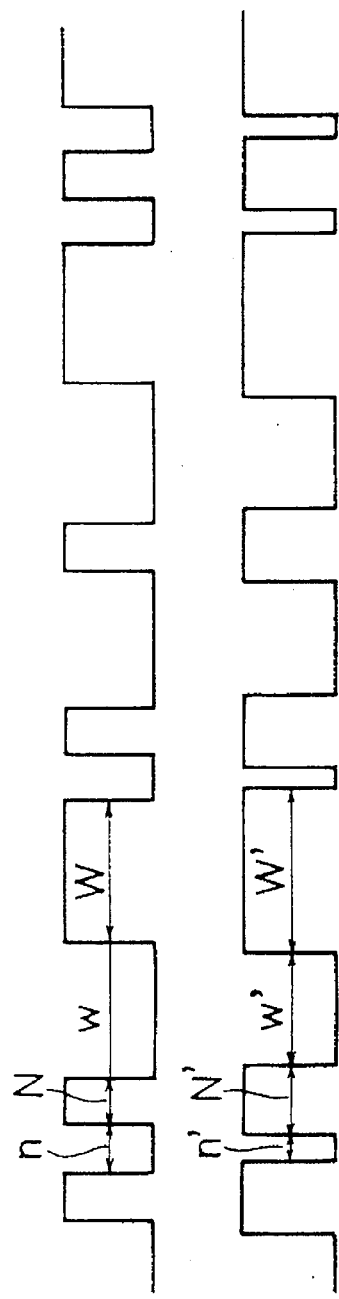
Fig. 38a
Fig. 38b
Fig. 38c

This application is a continuation of application Ser. No. 08/053,591, filed Apr. 28, 1993, now abandoned.

SYSTEM FOR PROVIDING AN ACCURATE INDICATION WHETHER FILM IS EXPOSED OR UNEXPOSED, INDEPENDENT OF BATTERY VOLTAGE

BACKGROUND OF THE INVENTION

1. Field of the Invention

The present invention generally relates to a camera and a film cartridge, used in the camera, which encloses the whole part of film up to the tip when the cartridge is not loaded in the camera, and particularly relates to a system for providing an exposed/unexposed indication for a film.

2. Description of the Related Arts

As an example of this type of cartridge, the following has been suggested. The cartridge has a data disk displaying the data of the sensitivity of a film and that of the number of frames by means of a bar code. The data disk is formed on an end of the spool of the cartridge and flush against the flat end surface of the casing of the cartridge. The camera has a sensor such as a photoreflector for reading the signal of the bar code. Data is read from the rotating data disk when the film is fed.

Different from a conventional film cartridge, this type of cartridge casing encloses the whole part of the film up to the tip when the cartridge is not loaded in the camera; therefore, it is impossible to discern whether or not the film has been exposed as is. In order to overcome this problem, a pointing mark such as an arrow showing the rotational angle of the data disk is designated on the surface thereof, and the film feeding mechanism of the camera has can be adapted as follows: The rotational angle of the data disk with respect to the reference line of the cartridge casing at the time when the film has been exposed is different from the rotational angle thereof with respect thereto at the time when the film has not been exposed; and, display marks such as characters or symbols for providing an exposed/unexposed indication for the film are designated on the cylindrical outer surface of the cartridge casing at each stop position of the data disk (pointing mark). In this manner, whether the film has been exposed or unexposed can be displayed.

However, the voltage of a battery accommodated in the camera changes, depending upon the frequency of use. As a result, the rotational speed of the spool changes. Therefore, according to the above-described construction, the spool stops at different angles, depending upon the time when the spool rotates at a high speed and the time when the spool rotates at a low speed. That is, the data disk does not stop at a predetermined position, which causes a user to erroneously detect whether the film has been exposed or not.

SUMMARY OF THE INVENTION

It is an object of the present invention to provide a camera using a cartridge in which a spool is stopped at a predetermined angle irrespective of the fluctuation of a supply voltage and in which a pointing mark of a data disk can be stopped accurately at each display mark of a cartridge casing so that whether a film has been exposed or unexposed is not erroneously detected.

In accomplishing these and other objects of the present invention, the system for providing an exposed/unexposed indication for a film comprises a camera, and a cartridge, used in the camera, which has a data disk formed on an outer surface thereof. The data disk is rotatable together with a spool and functions as a display member. The system is constructed as follows:

The cartridge has a plurality of display marks on the outer surface of the cartridge casing to display whether the film has been exposed or unexposed. The data disk has a pointing mark which points to any one of the display marks according to whether the film has been exposed or not. The camera comprises: sensor means facing the data disk for detecting the data signal of the disk; a film feeding mechanism having a fork which rotates together with a spool in engagement therewith and a motor for driving the fork; and power supply means for driving the motor; means for setting the stop position of the spool according to whether or not the film has been exposed by using a predetermined data signal which the sensor means has read from the disk as a positional signal when the film feeding mechanism rewinds the film; and rewinding control means for detecting the supply voltage of the camera and controlling the number of rotations of the data disk or that of the spool according to the voltage of the camera in rewinding the film.

The rotational speed of the motor can be controlled by changing the width of a driving pulse generated on the supply voltage detected by the supply voltage detecting means or by changing the width of a driving pulse generated on the information supplied by rotational speed detecting means provided separately for detecting the rotational speed of the spool.

Means for setting the stop position of the spool may be provided with stop indicating means for stopping the motor at a predetermined time so as to stop the fork at a position corresponding to any one of the display marks. The camera may comprise control means for controlling the rotational speed of the motor so that the rotational speed of the fork is constant when the fork is driven. It is preferable that the rotational speed of the fork be controlled to be constant regardless of the ups and downs of the voltage detected by the supply voltage detecting means.

According to the above construction, the data disk rotates together with the spool driven by the film feeding mechanism when the film is rewound. The sensor means facing the data disk reads a data signal of the data disk. The means for setting the stop position of the spool uses the data signal as a position signal so that the stop position of the spool is set according to whether some frames or all frames of the film have been exposed. In rewinding the film, the number of rotations of the data disk or that of the spool is controlled according to the supply voltage detected by the rewinding control means.

The following advantage can be obtained by the system for providing an exposed/unexposed indication for a film according to the present invention: The rotational speed of the spool in rewinding the film can be kept constant regardless of whether the supply voltage is high or low. As a result, the spool can be stopped at a predetermined position when the motor is stopped. Thus, a user can be prevented from erroneously detecting whether or not the film has been exposed.

BRIEF DESCRIPTION OF THE DRAWINGS

This and other objects and features of the present invention will become clear from the following description taken in conjunction with the preferred embodiments thereof with reference to the accompanying drawings, in which:

FIG. 4 is a perspective view showing the film taken out from the cartridge;

FIG. 38a, 38b, and 38c are explanatory view for showing calculations to be performed in discriminating narrow and wide bar codes from each other.

DETAILED DESCRIPTION OF THE INVENTION

Figure 1:
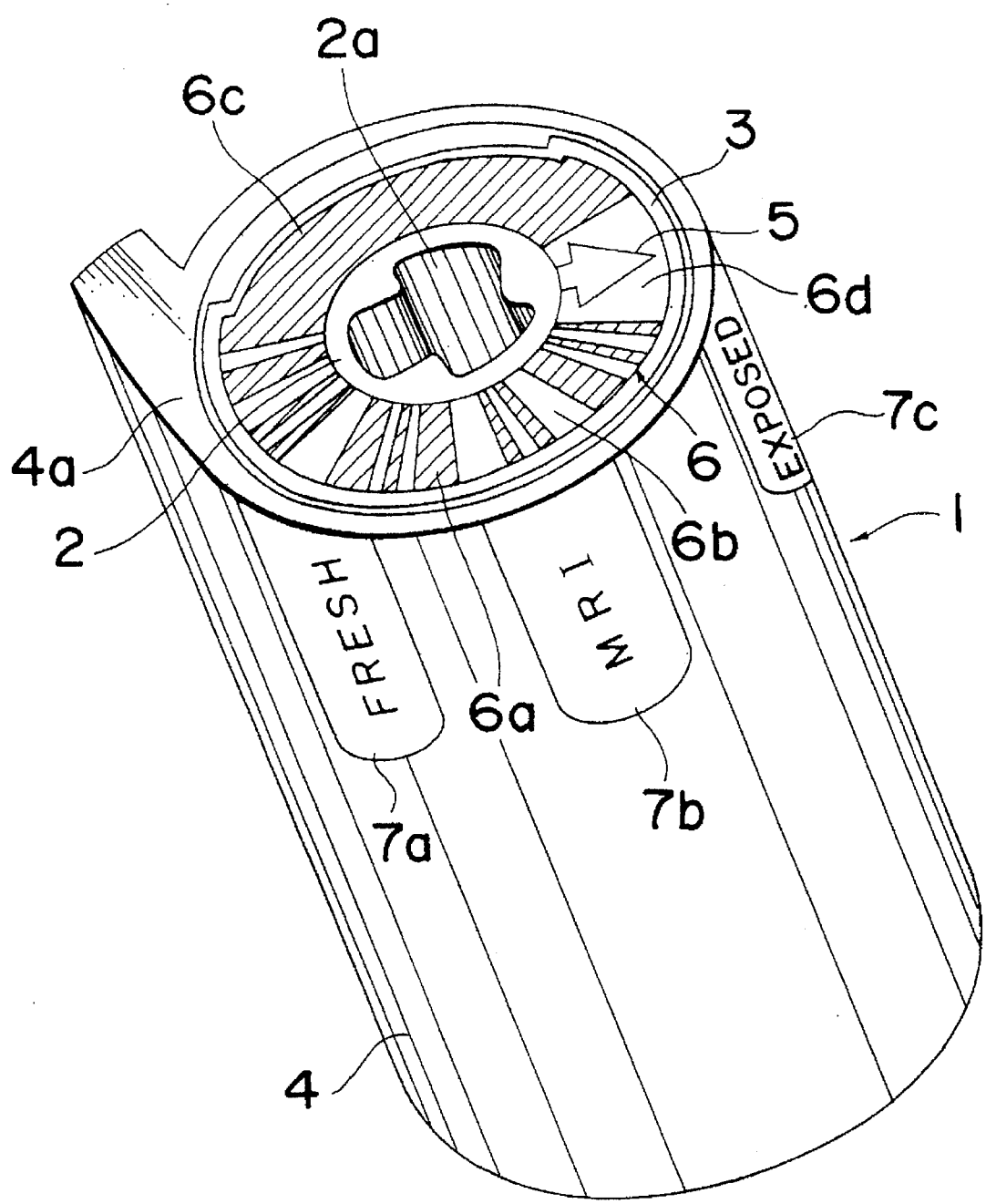
FIG. 1 is a perspective view showing a film cartridge used in a camera according to an embodiment of the present invention.

Before the description of the present invention proceeds, it is to be noted that like parts are designated by like reference numerals throughout the accompanying drawings.

Referring to FIGS. 1 through 38, description is made below of a system, which is comprised of a camera and a film cartridge used in the camera, for providing an exposed/unexposed indication for a film according to a preferred embodiment of the present invention.

FIG. 1 shows the cartridge 1 used in the camera. The leading end of a film is enclosed in a cartridge casing 4 when the cartridge 1 is not loaded in the camera. The camera has an automatic loading mechanism of feeding the film out of the casing 4 and automatically winding the film around a spool 2. The cartridge 1 has a data disk 3 indicating the information of a film sensitivity and the number of frames thereof by means of a bar code 6. The data disk 3 is disposed on one end of the spool 2 having an uncircular driving opening 2a which engages a film-rewinding fork of the camera. The data disk 3 is substantially flush with an end surface 4a of the casing 4.

The camera has a cartridge chamber in which the cartridge 1 is loaded along the axial direction of the spool 2. The fork installed in the cartridge chamber is pressed downward by the spool 2 in loading the cartridge 1 thereinto and then rotates. When the phase of the fork coincides with that of the driving opening 2a of the spool 2, the fork is inserted into the spool 2. The detailed construction of the fork will be described later with reference to FIG. 14.

The bar code 6 will be described below with reference to FIG. 1. In the embodiment, a region 6a shown by hatching is referred to as a bar; a white region 6b is referred to as a space; a wide black region 6c is referred to as a black zone; and a wide white region 6d is referred to as a quiet zone. Except the black zone 6c and the quiet zone 6d, 11 bars 6a including wide ones and narrow ones and 11 spaces 6b including wide ones and narrow ones are formed on the disk 3. The data of the film sensitivity and the number of frames thereof are indicated in combination of the bar 6a and the space 6b. The width of the bar 6a adjacent to the quiet zone 6d and that of the space 6b adjacent to the black zone 6c are narrow. The ratio of the width of the wide bar 6a to that of the narrow bar 6a and the ratio of the width of the wide space 6b to that of the narrow space 6b are both 3:1.

Figure 2A:
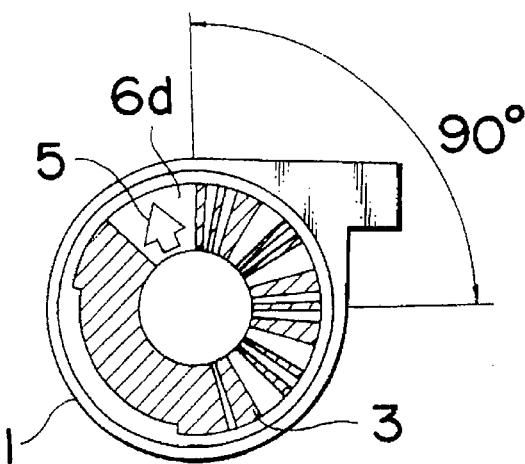
FIG. 2a is a view showing the position at which a data disk stops when the film has not been exposed.
Figure 2B:
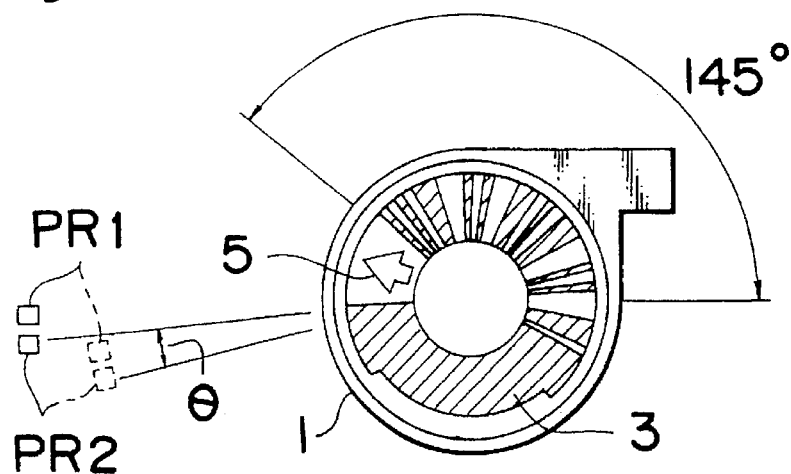
FIG. 2b is a view showing the position at which the data disk stops when some frames of the film have been exposed.
Figure 2C:
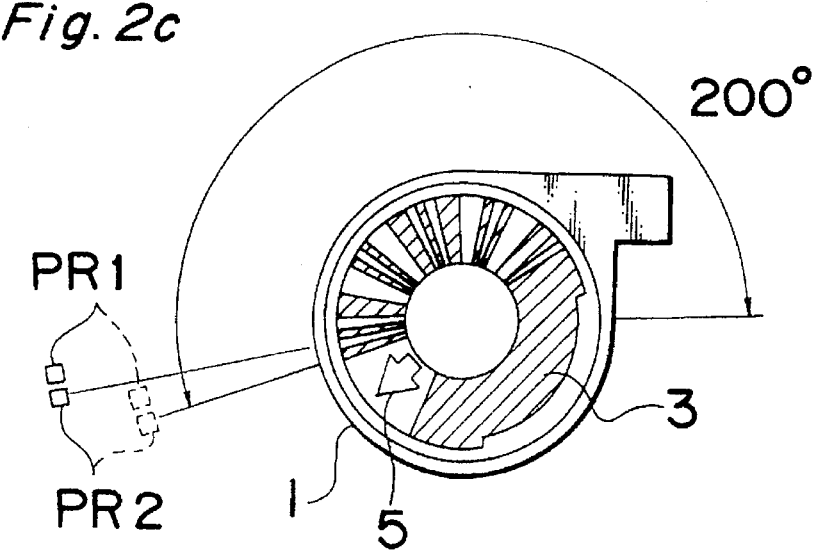
FIG. 2c is a view showing the position at which the data disk stops when all the frames of the film have been exposed.

An arrow 5 is indicated on the surface of the disk 3 as a pointing mark so as to indicate the rotational angle thereof. Three kinds of display marks 7a, 7b, and 7c are formed on the cylindrical surface of the casing 4 so as to provide exposed/unexposed indication to a film: FRESH indicating that no frames have been exposed; MRI indicating that some frames have been exposed; and EXPOSED indicating that all frames have been exposed. When the disk 3 rotates and stops at the position of FRESH indicated by the arrow 5 as shown in FIG. 2a, with the edge of the quiet zone 6d adjacent to the bar 6a forming 90° with a reference line, it is indicated that no frames of the film have been exposed. When the disk 3 rotates and stops at the position of MRI indicated by the arrow 5 as shown in FIG. 2b, with the edge of the quiet zone 6d forming 145° with the reference line, it is indicated that some frames have been exposed. When the disk 3 rotates and stops at a position of EXPOSED indicated by the arrow 5 as shown in FIG. 2c, with the edge forming 200° with the reference line, it is indicated that all frames have been exposed. Therefore, the arrow 5 of a new cartridge indicates FRESH and the arrow 5 of a cartridge once loaded in the cartridge chamber indicates MRI or EXPOSED.

The mechanism for feeding the film is described below. The disk 3 is stopped by a control means at a position corresponding to that shown by FIG. 2b when some frames have been exposed and at a position corresponding to that shown by FIG. 2c when all frames have been exposed. Therefore, when the film is rewound, the control means which will be described later controls the disk 3 so as to stop the disk 3 at a position corresponding to the number of frames which have been exposed. If the spool 2 rotates when the cartridge 1 is taken out from the cartridge chamber, there is a possibility that exposed/unexposed indication to the film is erroneously recognized. Therefore, an unshown locking mechanism is provided inside the casing 4 so as to stop the rotation of the spool 2 when the cartridge 1 is not loaded in the camera.

Figure 3A:
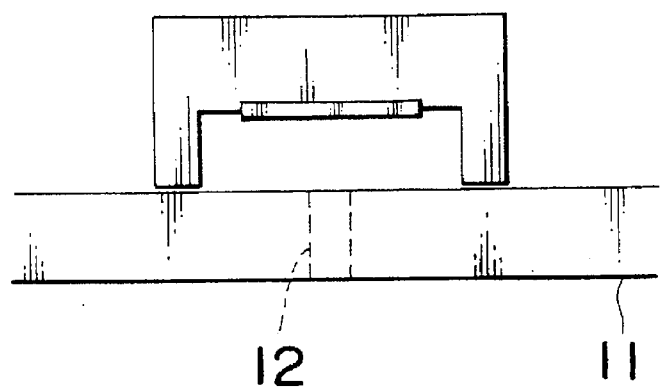
FIG. 3a is a side elevation showing the construction of the portion on which a photoreflector for reading the data of the data disk is installed.
Figure 3B:
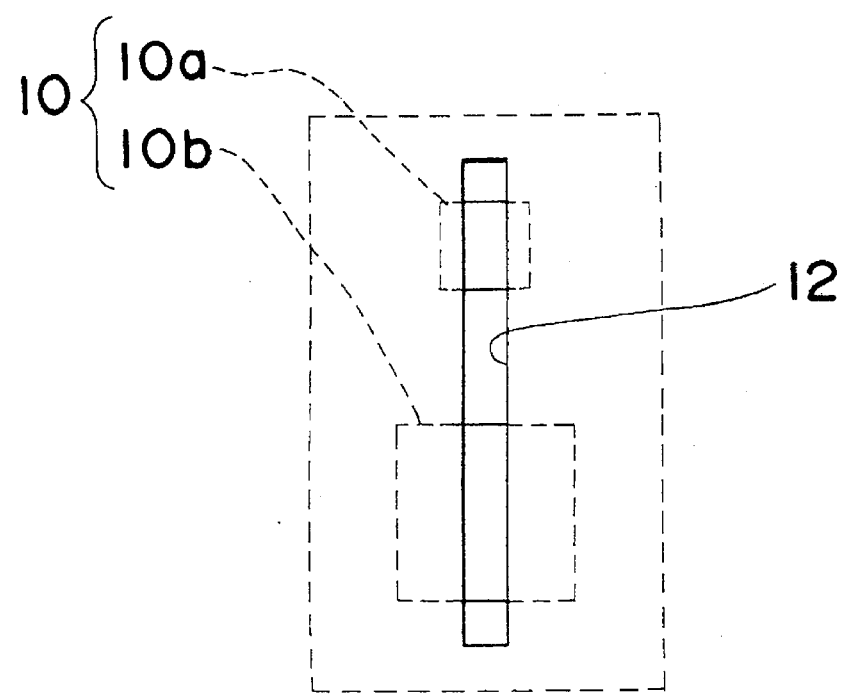
FIG. 3b is a bottom view showing the construction of the portion on which the photoreflector for reading the data disk is installed.

FIGS. 3a and 3b show the construction of a mounting portion on which a photoreflector 10 serving as a sensor for reading the signal of the bar code 6 of the disk 3 is installed. FIG. 3a is a side elevation showing the mounting portion. FIG. 3b is a bottom view showing the mounting portion. The photoreflector 10 having a light emitting portion 10a and a light detecting portion 10b is provided in the camera body so that the photoreflector 10 faces to the disk 3 when the cartridge 1 is loaded in the cartridge chamber. In order for the photoreflector 10 to read signals accurately with a high resolution, a slit 12 formed in a mounting plate 11 limits the passage range of detecting light to a small range. Although not shown in the drawings, a pair of photoreflectors 10, each having the same construction as shown in FIG. 3, are disposed abreast. The interval between the two photoreflectors 10 adjacent to each other is greater than the width of the narrow bar 6a and smaller than the double thereof so that emitting light is not incident simultaneously on the adjacent bars 6a or the adjacent spaces 6b.

As shown in FIG. 4, the film 8 enclosed in the cartridge 1 has a plurality of frames. A first perforation 8a is formed outside the forward end of each frame and a second perforation 8b is formed outside the rear end thereof, along one longitudinal edge of the film 8, respectively. In addition to the first and second perforations 8a and 8b, the film 8 has a perforation 8c formed forward of the first perforation 8a located nearest to the forward tip of the film 8, and perforations 8d and 8e formed rearward of the second perforation 8b of the last frame with the perforation 8e being located nearest to the rearward tip of the film 8. The interval between the perforations 8d and 8e is smaller than that between the perforations 8a and 8b. In addition to the photoreflector 10 for reading the information of the disk 3, the camera has another photoreflector for detecting the position of the perforations 8a through 8e, thus serving as a sensor for setting the frame of the film 8.

Figure 5:
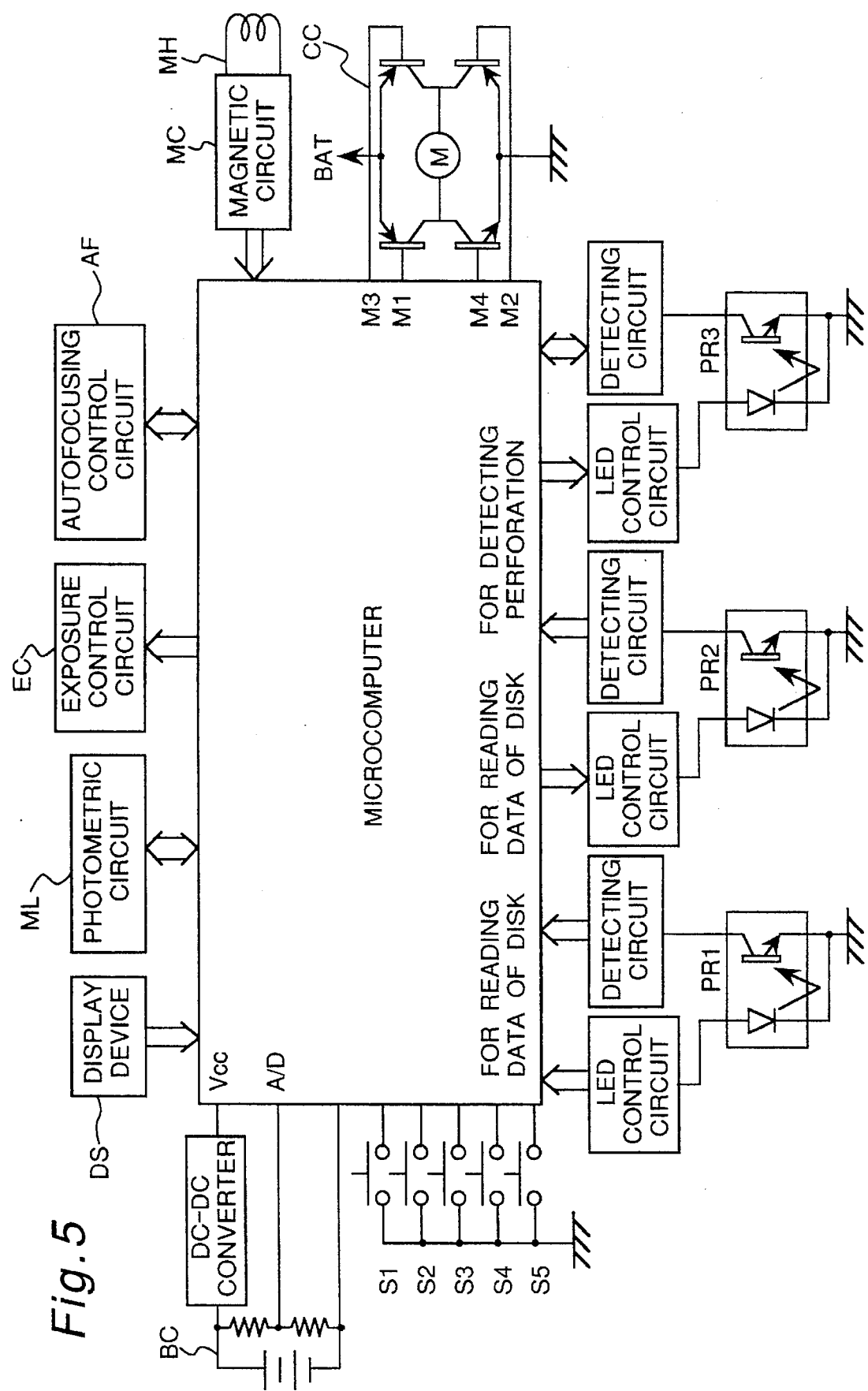
FIG. 5 is a block diagram showing the schematic construction of the circuit of the camera.

FIG. 5 is a block diagram showing the schematic circuit construction of the camera. A microcomputer COM shown in the center of FIG. 5 is connected with the following circuits and devices: an automatic focusing control circuit AF; an exposure control circuit EC; a photometric circuit ML; and a display device DS, installed on the camera main body, for displaying the data of shutter speed, diaphragm, and other photographing data.

The microcomputer COM is also connected with the following circuits and devices: disk-detecting photoreflectors PR1 and PR2 (corresponding to the photoreflector 10 shown in FIG. 3), connected with the microcomputer COM, for detecting the disk 3 via a control circuit and a detecting circuit; a film-detecting photoreflector PR3 connected with the microcomputer COM via a control circuit and a detecting circuit. The disk-detecting photoreflectors PR1 and PR2 output a low level signal (L) when they have detected the bar 6a and a high level signal (H) when they have detected the space 6b. The film-detecting photoreflector PR3 outputs a low level signal (L) when the front surface of the photoreflector PR3 is intercepted by the film and outputs a high level signal (H) when the front surface of the photoreflector PR3 is not intercepted by the film or a perforation is disposed on the front surface thereof. The photoreflector PR1 is disposed ahead of the photoreflector PR2 in the rotational direction of the disk 3 in feeding the film.

A film winding/rewinding motor (M) is also connected with the microcomputer COM. A high level signal (H) and a low level signal (L) are sent from the microcomputer COM to the motor (M) via terminals M1, M2, M3, and M4 and a control circuit CC by appropriately combining them with each other to control the forward and backward rotations of the motor (M). The following switches S1, S2, S3, S4, and S5 are also connected with the microcomputer COM: The release switch S1 is turned on when a shutter release button is pushed in. The rewinding switch S2 is turned on when it is manually operated by a user. The cover switch S3 is turned on when the cover of a cartridge-loading portion provided on the camera main body is closed. The detecting switch S4 detects the engagement between the spool 2 of the cartridge 1 and the fork. The switch S5 for detecting the rotation of the fork is turned on and off alternately each time the fork rotates 360°. A power circuit BC incorporating a DC—DC converter is also connected with the microcomputer COM.

A magnetic surface is formed on the film according to this embodiment and the camera according to this embodiment has a magnetic head MH and a magnetic circuit MC so that magnetic data is read from the magnetic surface and written thereon. Information is written on the magnetic surface of the film if a frame is exposed to light. When a film having some frames exposed to light is loaded in the casing 4, the information written on the film allows unexposed frames to be discriminated from exposed frames.

Figure 6:
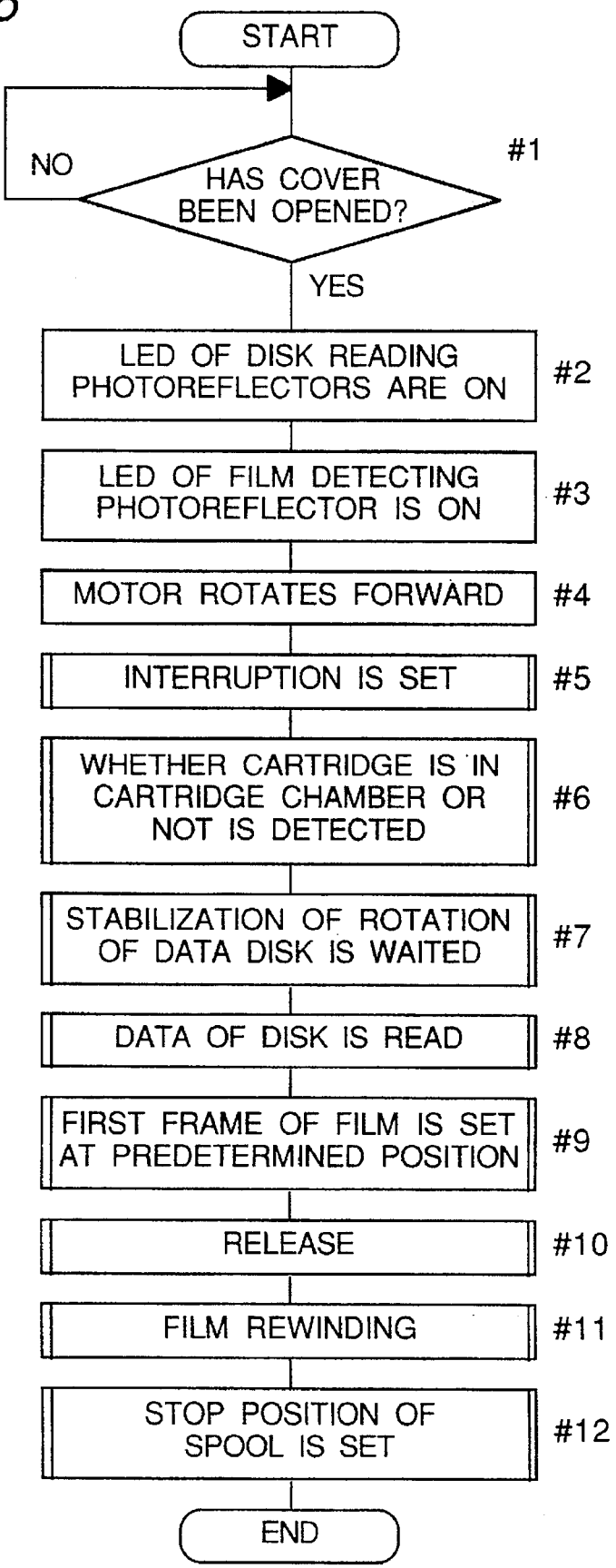
FIG. 6 is a flowchart showing a fundamental flow of the operation of the camera.

The operation of the camera is described below with reference to the flowcharts shown in the drawings. FIG. 6 is a flowchart showing the fundamental flow of the operation of the camera. First, when it is detected at step #1 based on the change in state of the cover switch S3 that the cartridge-loading cover has been closed, the LED of the photoreflector PR1 and that of the photoreflector PR2 are turned on at step #2, and the LED of the photoreflector PR3 is turned on at step #3. At step #4, an automatic loading of the film is carried out, i.e., the motor (M) starts a forward rotation to feed out the film from the cartridge 1. At step #5, an interruption is set. At step #6, it is detected whether or not the cartridge 1 has been enclosed in the cartridge chamber. When it is decided at step #7 that the rotation of the data disk 3 has been stabilized, data is read from the disk 3 at step #8. At step #9, the first frame of the film is set at a predetermined position. In this manner, the preparation for taking a photograph is completed.

At step #10, the shutter is released by a photographer. At step #11, the film is rewound. In rewinding the film, the stop position of the spool 2 is set at step #12 so that the disk 3 stops at the position shown in FIGS. 2b or 2c according to the number of frames exposed to light.

Figure 7:
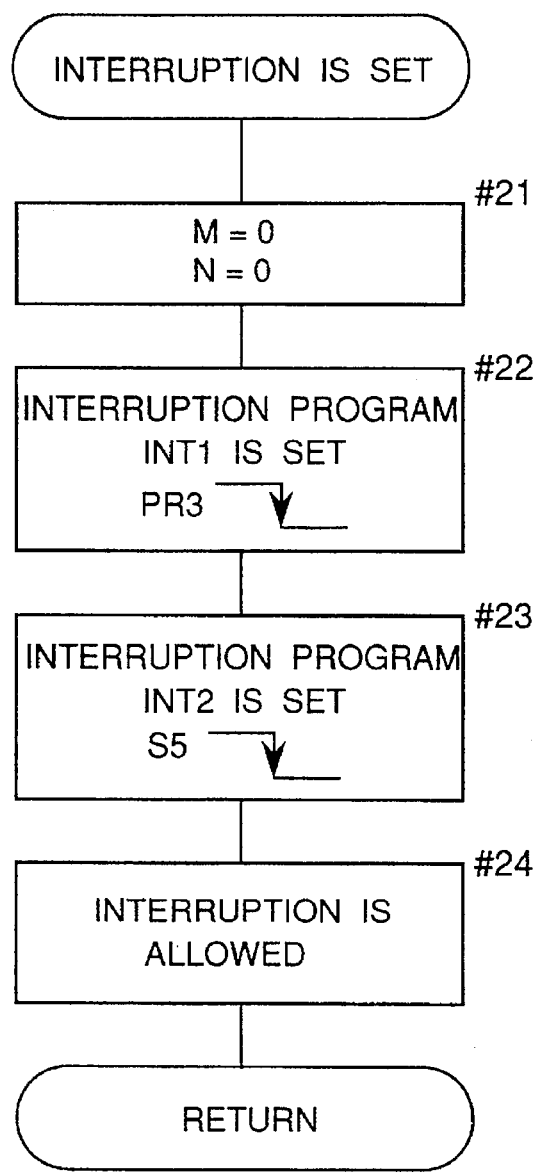
FIG. 7 is a flowchart showing the setting of an interruption.

The interruption is set at step #5 according to the flowchart of FIG. 7. First, at step #21, a variable (M) indicating the number of rotations of the disk 3 and obtained from the change in the level of a signal outputted from the switch S5 for detecting the rotation of the fork is set to "0", and a value (N) indicating the number of changes in the level of a signal outputted from the photoreflector PR3 is set to "0". An interruption program INT1 shown by the flowchart of FIG. 9 and an interruption program INT2 shown by the flowchart of FIG. 11 are set at steps #22 and #23, respectively, with the change in the level of the signal from a high level to a low level outputted from the photoreflector PR3 and the switch S5. At step #24, the interruption of each of the interruption programs INT1 and INT2 is allowed. Then, the program goes to step #6 at which it is detected whether or not the cartridge 1 is enclosed in the cartridge chamber.

Figure 8:
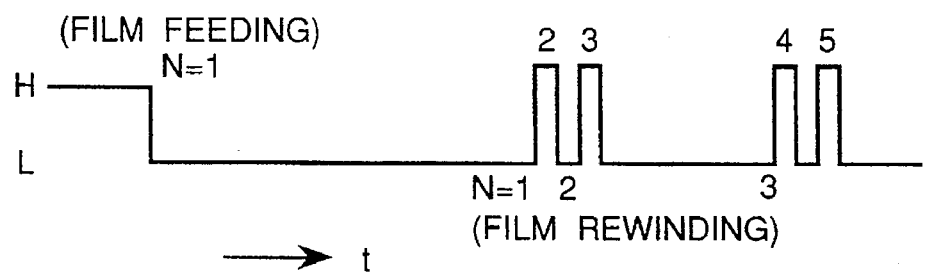
FIG. 8 is a view showing the change in the level of a signal outputted from a film detecting photoreflector in feeding the film.
Figure 9:
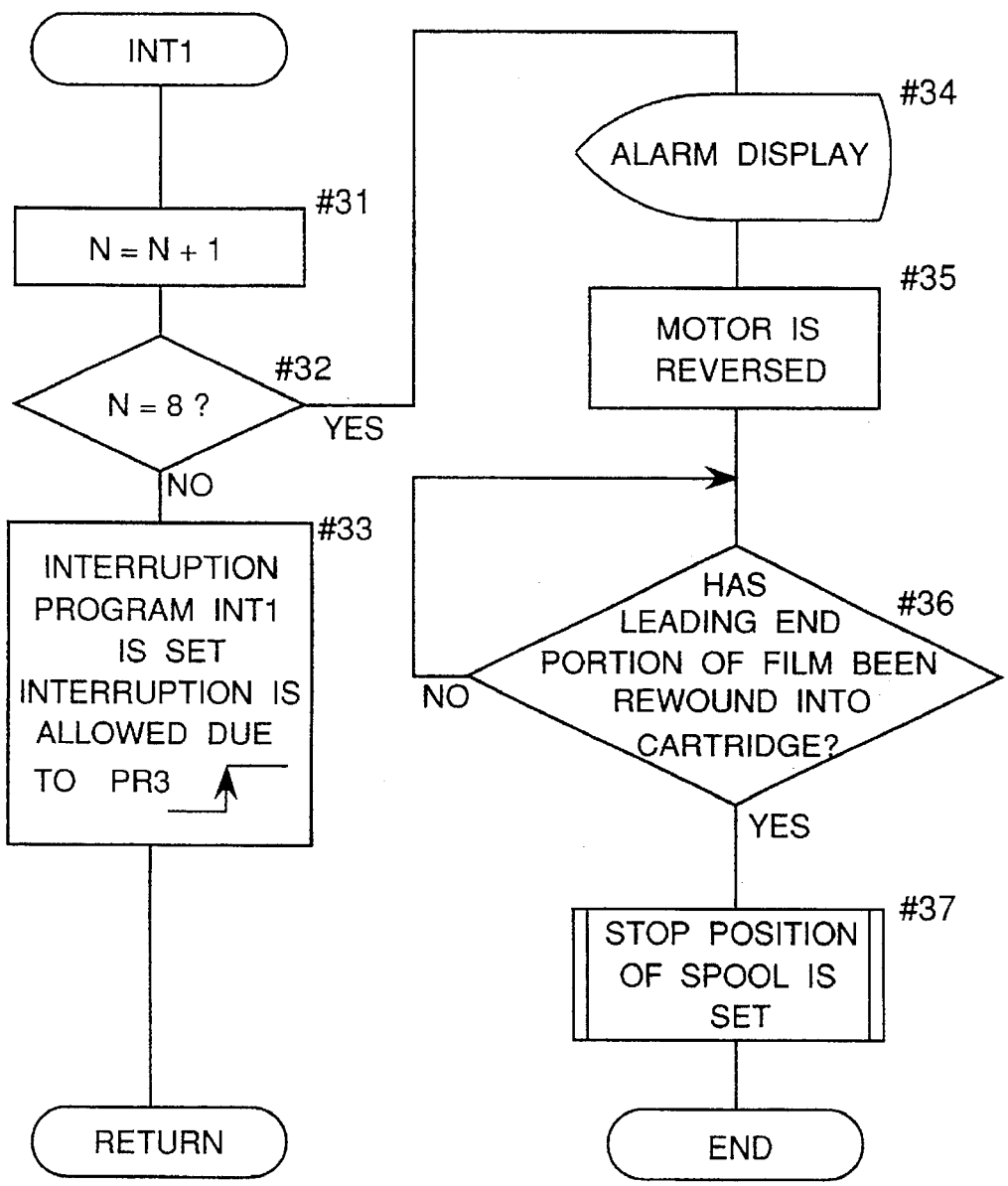
FIG. 9 is a flowchart showing an interruption program INT1.
Figure 10:
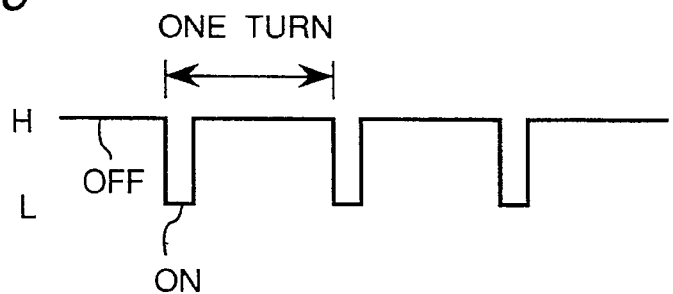
FIG. 10 is a flowchart showing the change in the level of a signal outputted from a switch for detecting the rotation of a fork.

The interruption program INT1 shown in FIG. 9 is described below. This operation is carried out at step #22 of FIG. 7 with the level fall of the signal outputted from the photoreflector PR3. In other words, the interruption operation is carried out as follows: When the leading end of the film is disposed in front of the photoreflector PR3, the level of the signal outputted from the photoreflector PR3 changes from a high (H) level Go a low (L) level, namely, at a point indicated by N=1 (film-feeding time) in FIG. 8 showing the level change in the signal outputted from photoreflector PR3. But actually, as will be described later, the execution of this operation is prohibited when data are read, while the film is rewound when the film has been fed more than a predetermined distance without data being read.

Therefore, in the flowchart of the interruption program INT1 of FIG. 9, at step #31, "1" is added to N. It is detected at step #32 whether N=8 or not. In this embodiment, when N=4, the first frame is set at the predetermined position. Therefore, it is detected at step #32 whether or not the third frame has been exposed. If it is decided at step #32 that N has not reached "8", at step #33, the interruption program INT1 is set to be executed each time the signal outputted from the photoreflector PR3 changes from L level to H level. Then, the program returns to the step subsequent to the step at which the operation has suspended by the interruption. If it is decided at step #32 that N has reached "8", a display indicating that an abnormality has occurred is made at step #34 because the film has been fed more than is required without data being read. The motor (M) is reversed at steps #35 and #36 until it is detected that the leading end of the film has been rewound into the casing 4. Then, at step #37, the stop position of the spool 2 is set so that the disk 3 stops at the position of MRI indicated by the arrow 5, and the function of the camera is stopped. It is possible to properly adjust whether or not the film should be rewound as how much film is fed, by changing the value N at step #32.

Figure 11A:
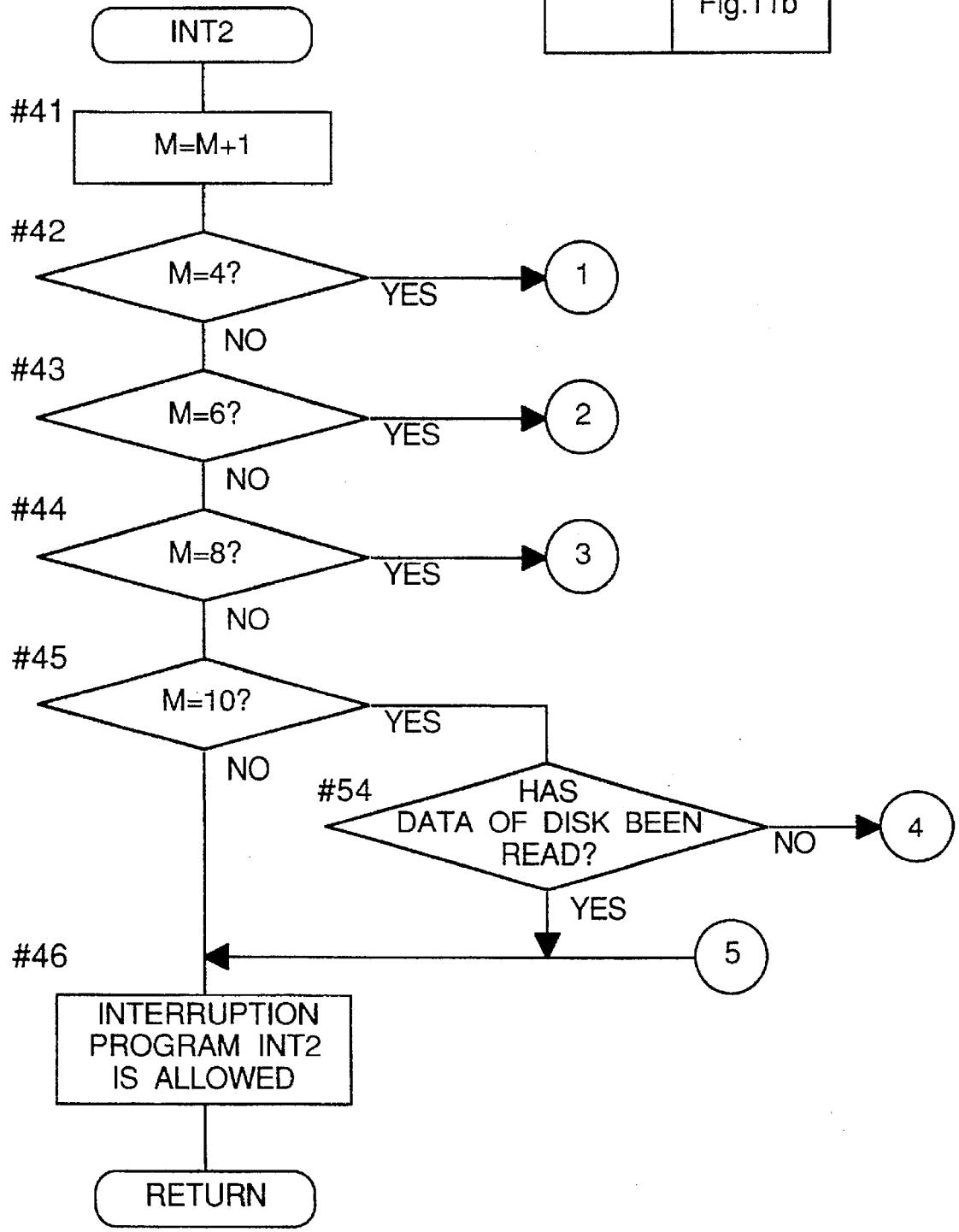
FIG. 11a and FIG. 11b are counterparts of a flowchart showing an interruption program INT2, with each line indicated by the same numeral through (1) to (5) to be connected together.
Figure 11B:
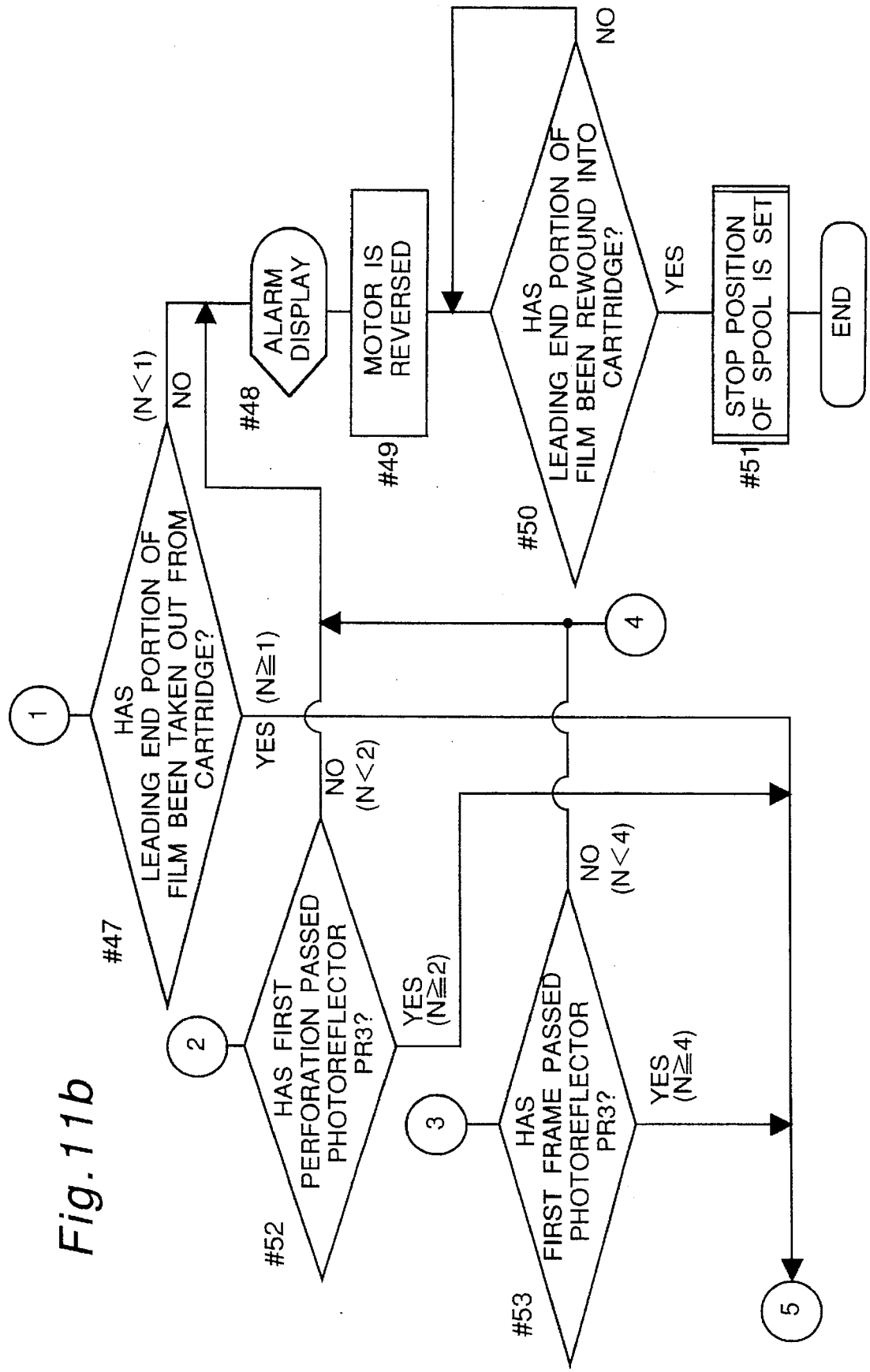

The interruption program INT2 is executed according to the flowchart shown in FIG. 11a and FIG. 11b. The switch S5 is turned on and off alternately each time the fork rotates 360°, as described previously. The signal outputted from the switch S5 repeats the pattern in the range of "one turn of the fork" shown in FIG. 10. That is, an L level signal is outputted from the switch S5 when the switch S5 is turned on, while an H level signal is outputted therefrom when the switch S5 is turned off. When the fall of the signal from H level to L level outputted from the S5 is detected, a variable (M) is counted by one at step #41, and it is decided at step #42 whether or not M=4, i.e., the disk 3 has made four turns. If not, it is decided at step #43 whether M=6 or not. If not, it is decided at step #44 whether M=8 or not. If not, it is decided at step #45 whether M=10 or not. If not, at step #46, the program returns to the step subsequent to the step at which the operation has been suspended due to the interruption, with the execution of the program INT2 allowed.

If it is decided at step #42 that M=4, it is discriminated at step #47 whether or not the leading end of the film 8 has been fed out from the casing 4 based on the value of N. If it is decided at step #47 (see FIG. 8.) that N≧1 and that the leading end of the film 8 has been fed out from the casing 4, the program goes to step #46. If it is decided that the disk has made four turns and N has not yet become 1, i.e., if the leading end of the film 8 has not been fed out from the casing 4, the program goes to step #48. At step #48, a display that an abnormality has occurred is made. At steps #49 and #50, the motor (M) is reversed until it is detected that the leading end of the film has been rewound. At step #51, the spool-stopping position is set so that the disk 3 stops at the position of MRI indicated by the arrow 5. Then, the function of the camera is stopped.

If it is detected at step #43 that the number (M) of rotations of the disk 3 is six, it is discriminated at step #52 whether or not the first perforation 8c has passed the photoreflector PR3. If it is decided that N≧2, the program goes to step #46. If it is decided that N<2, i.e., if the disk has made six turns and the first perforation 8a has not yet reached the photoreflector PR3, the program goes to step #48 and the steps subsequent thereto. If it is decided at step #44 that the disk 3 has made eight turns, it is decided at step #53 whether or not the first frame of the film has passed the photoreflector PR3. If it is decided at step #53 that N≧4 and that the first frame has passed the photoreflector PR3, the program returns to step #46. If it is decided at step #53 that the disk has made eight turns, that N.<4, and that the first frame has not passed the photoreflector PR3, the program goes to step #48 and steps subsequent thereto, and the film is wound around the spool 2. If it is detected at step #45 that the disk 3 has made 10 turns, the microcomputer COM discriminates at step #54 whether or not the data of the disk 3 has been read. If read, the program goes to step #46. If the disk 3 has made 10 turns and the data of the disk 3 has not yet been read, a display of abnormality is made at step #48, and then the program goes to step #49 and the steps subsequent thereto at which the film is wound around the spool 2. The discrimination is made at step #54 based on the result of the execution of the operation of the flowchart shown in FIG. 15 which will be described later. As described above, if the operation which should have been executed according to the number of rotations of the disk 3 has not been executed, it is decided that an abnormality has occurred and thus the film is wound around the spool according to the program and the function of the camera stops.

Figure 12:
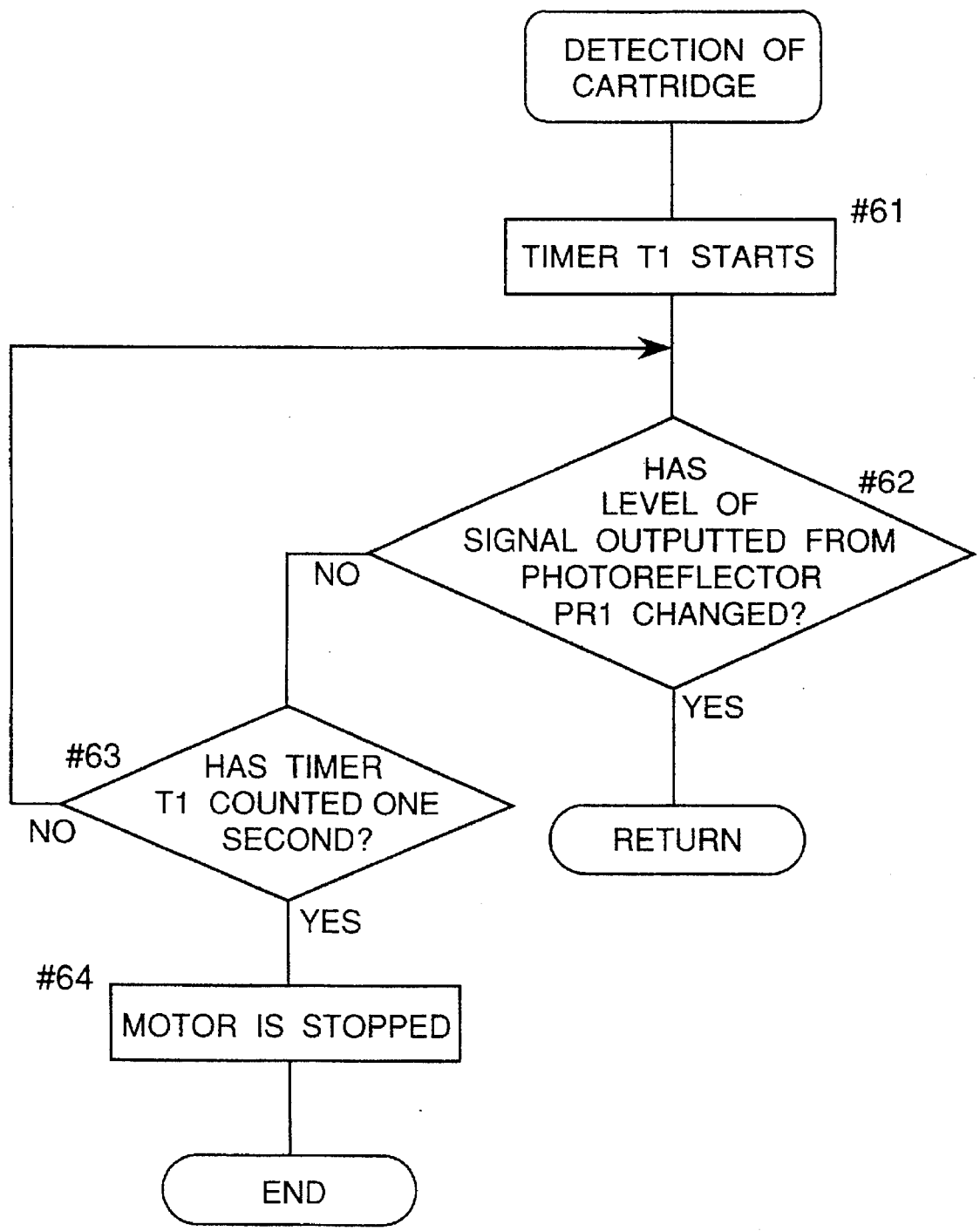
FIG. 12 is a flowchart showing an operation of detecting whether or not a cartridge is in the camera.

The operation of detecting whether or not the cartridge 1 has been loaded in the cartridge chamber is executed at step #6 in accordance with the flowchart shown in FIG. 12. In this flow, a timer T1 starts at step #61. It is discriminated at step #62 whether or not the level of the signal outputted from the photoreflector PR1 has changed. If changed, i.e., if the cartridge 1 has been loaded in the cartridge chamber, the operation of step #7 of the flowchart shown in FIG. 6 is executed. If it is decided at step #62 that the level of the signal has not changed, the program goes to step #63 at which it is decided whether or not one second has been counted by the timer T1. If counted, it is decided that the cartridge 1 has not been loaded in the cartridge chamber and thus the motor (M) is stopped at step #64. The one second counted by the timer T1 is the time enough to make the fork engage with the spool 2 of the cartridge 1 and to make the data disk 3 starts. A lever switch may be provided in the cartridge chamber to mechanically detect the loading of the cartridge 1 in the cartridge chamber.

Figure 13:
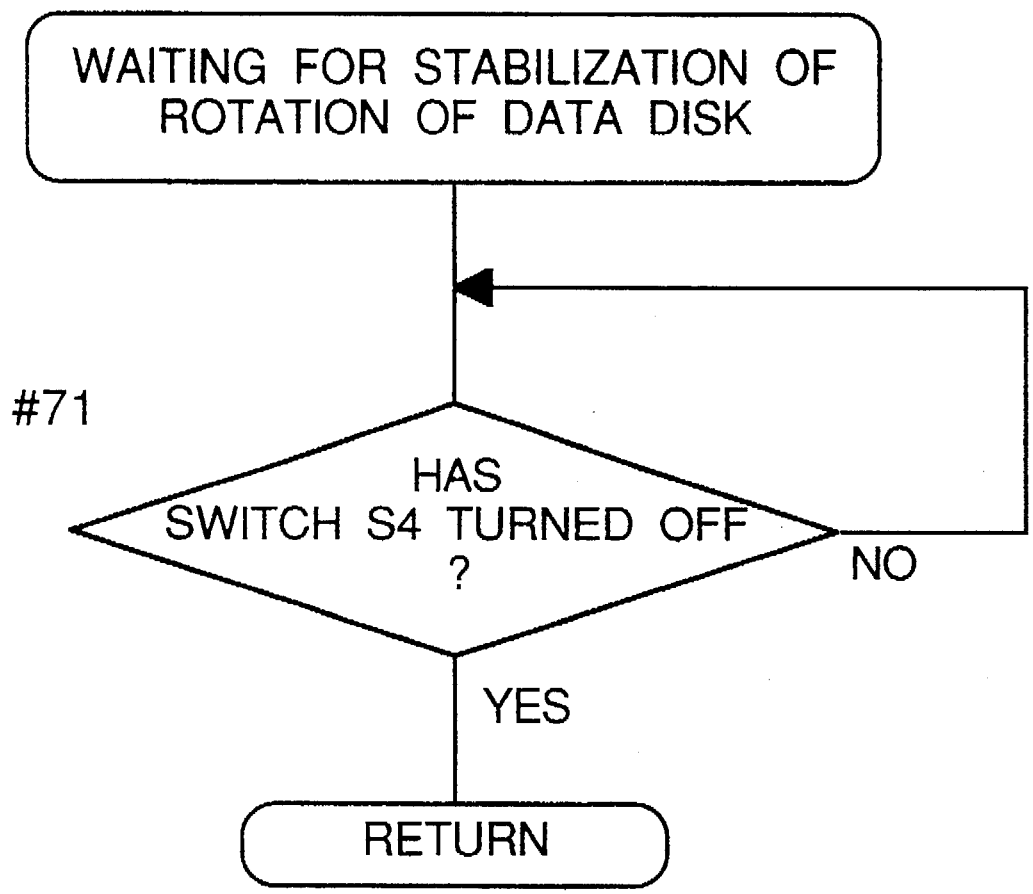
FIG. 13 is a flowchart showing an operation of waiting for the stabilization of the data disk.
Figure 14:
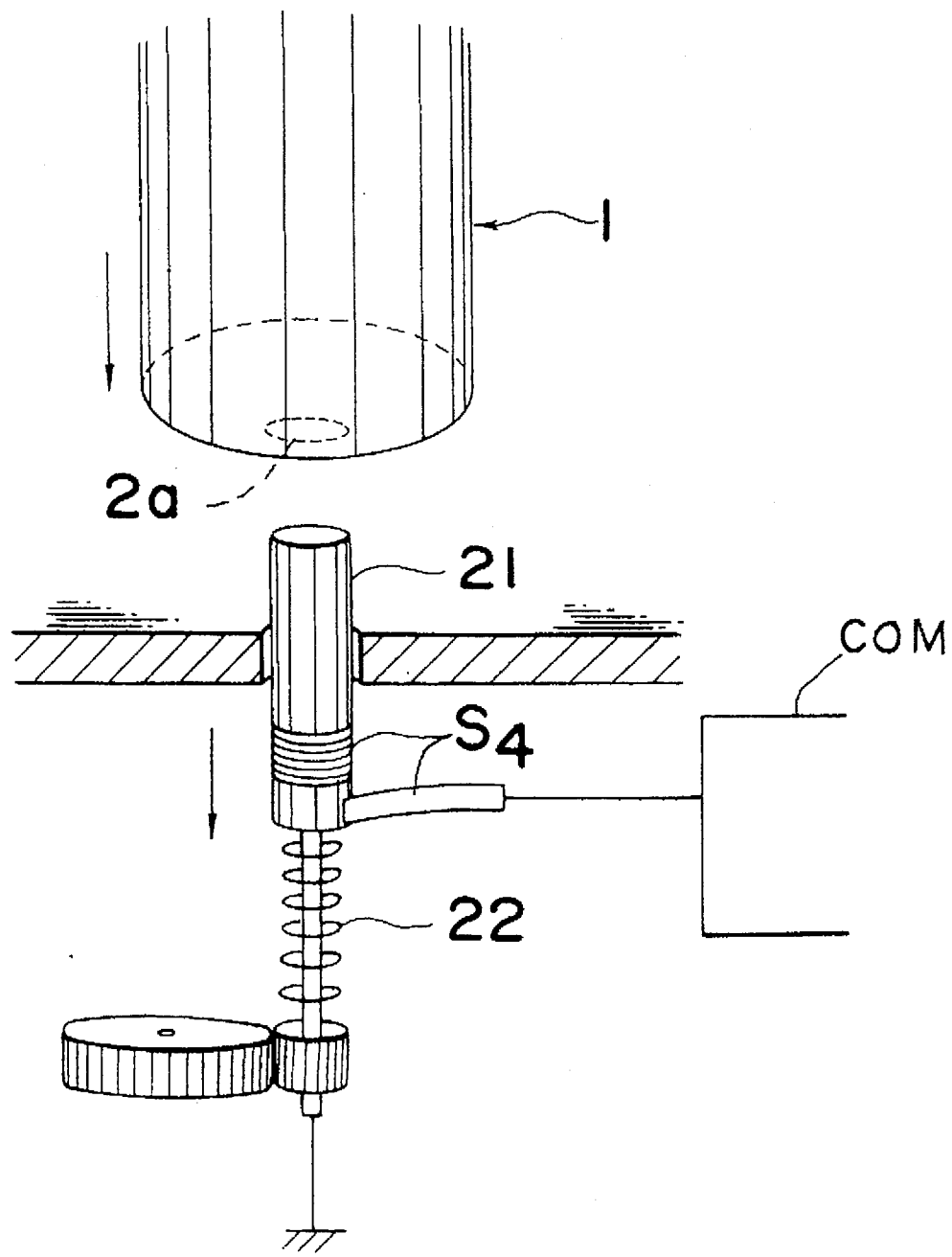
FIG. 14 is a perspective view showing the schematic construction of a film winding fork.

The operation of waiting for the stabilization of the rotation of the disk 3 is executed at step #7 in accordance with the flowchart shown in FIG. 13. The schematic construction of the fork 21 for rotating the disk 3 is shown in FIG. 14. That is, the fork 21 and the driving opening 2a of the spool 2 are shaped in the same uncircular configuration so that the fork 21 is pressed downward when the cartridge 1 is loaded in the cartridge chamber. A spring 22 is provided to press the fork 21 upward to the original position at which the fork 21 and the spool 21 engage each other when the phase of the fork 21 and that of the spool 2 become coincident with each other as a result of the rotation of the fork 21. As described previously, the switch S4 is turned on when the fork 21 is pressed downward and turned off when the fork 21 has returned to the original position.

According to the construction of the fork 21, the operation of waiting for the stabilization of the rotation of the disk 3 is controlled as follows: It is detected at step #71 of the flowchart shown in FIG. 13 whether or not the switch S4 has changed from ON to OFF. If it is decided that the spool 2 and the fork 21 have engaged each other as a result of the changeover of the switch S4 from ON to OFF, the program goes to step #8 of FIG. 6. The flow of FIG. 13 is executed when the cartridge 1 is in the cartridge chamber. Therefore, only the detection of the changeover of the switch S4 from ON to OFF allows the decision that the rotation of the disk 3 has stabilized with the spool 2 and the fork 21 engaging each other.

Figure 15:
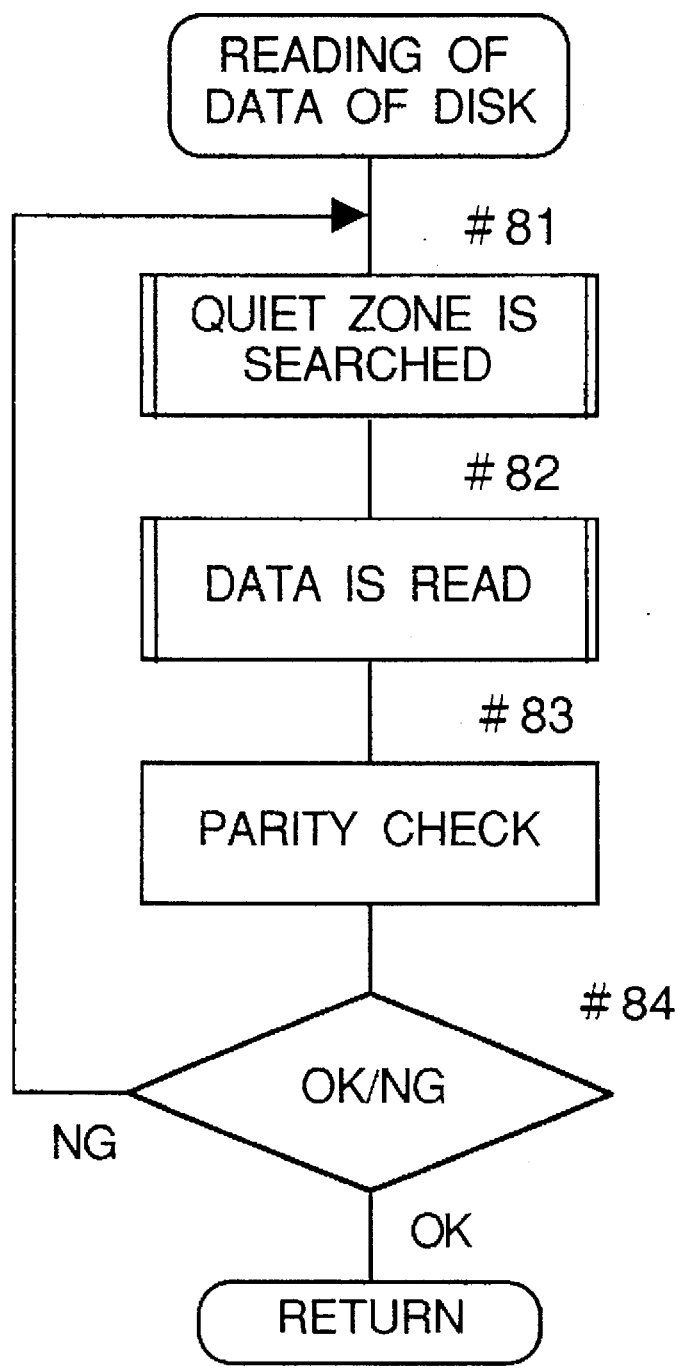
FIG. 15 is a flowchart showing an operation of reading the data of the data disk.
Figure 16:
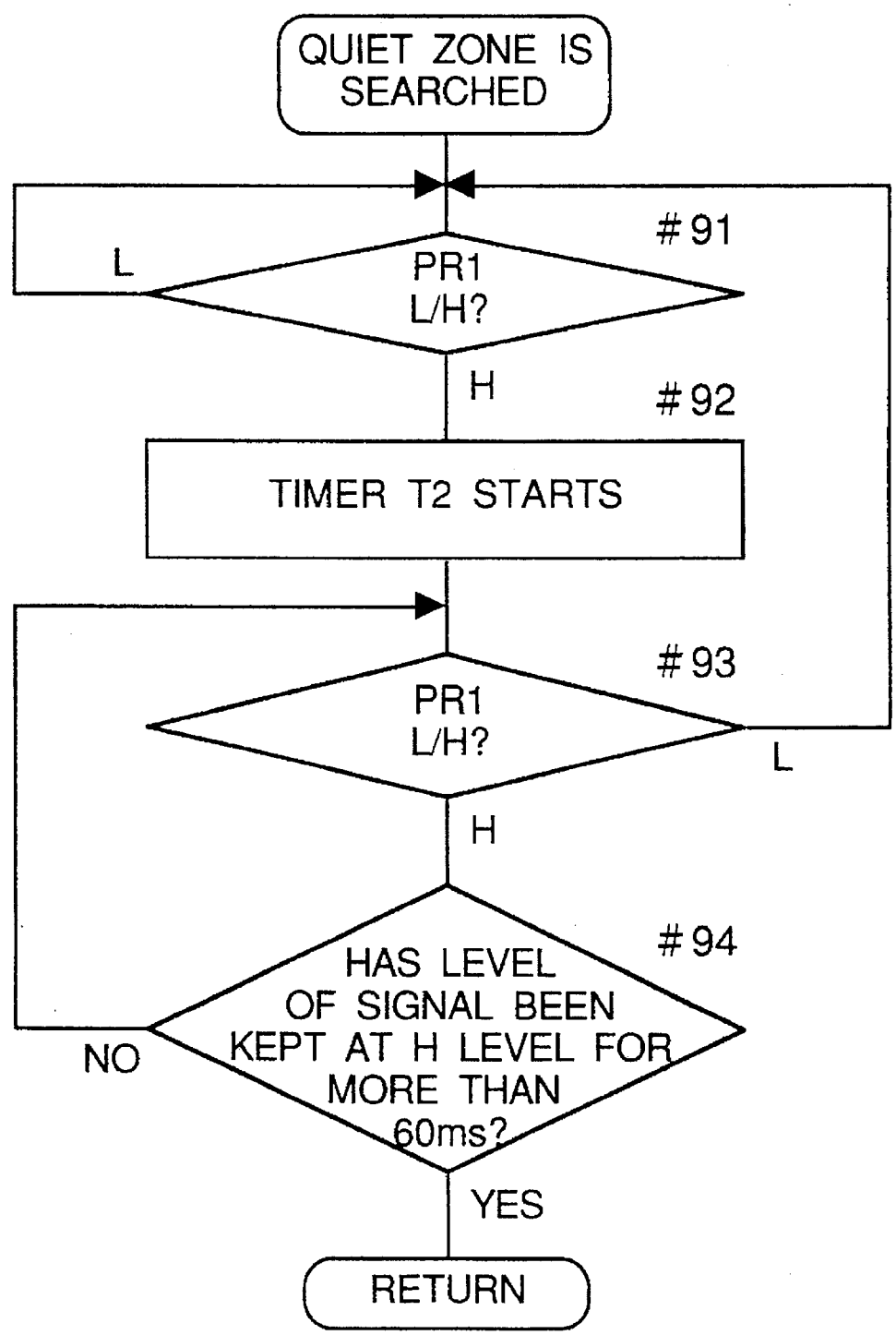
FIG. 16 is a flowchart showing an operation of searching a quiet zone.

The operation of reading the data of the disk 3 is performed at step #8 of FIG. 6 in accordance with the flowchart of FIG. 15. First, at step #81, the quiet zone 6d is detected by finding that the level of the signal outputted from the photoreflector PR1 does not change for a predetermined period of time. When the photoreflector PR1 has detected the space 6b of the bar code 6, it outputs the signal of H level. Therefore, the operation of searching the quiet zone 6d is executed as follows: As shown by the flowchart of FIG. 16, if it is detected at step #91 that the level of the signal outputted from the photoreflector PR1 has become H, the timer T2 is started at step #92, and it is discriminated at steps #93 and #94 whether or not the signal is kept at H level for a time period of 60 ms. If kept at H level, it is decided that the quiet zone 6d has passed the photoreflector PR1: If the space 6b has passed the photoreflector PR1, the signal outputted from the photoreflector PR1 is not kept at H level for the period of 60 ms.

Figure 17:
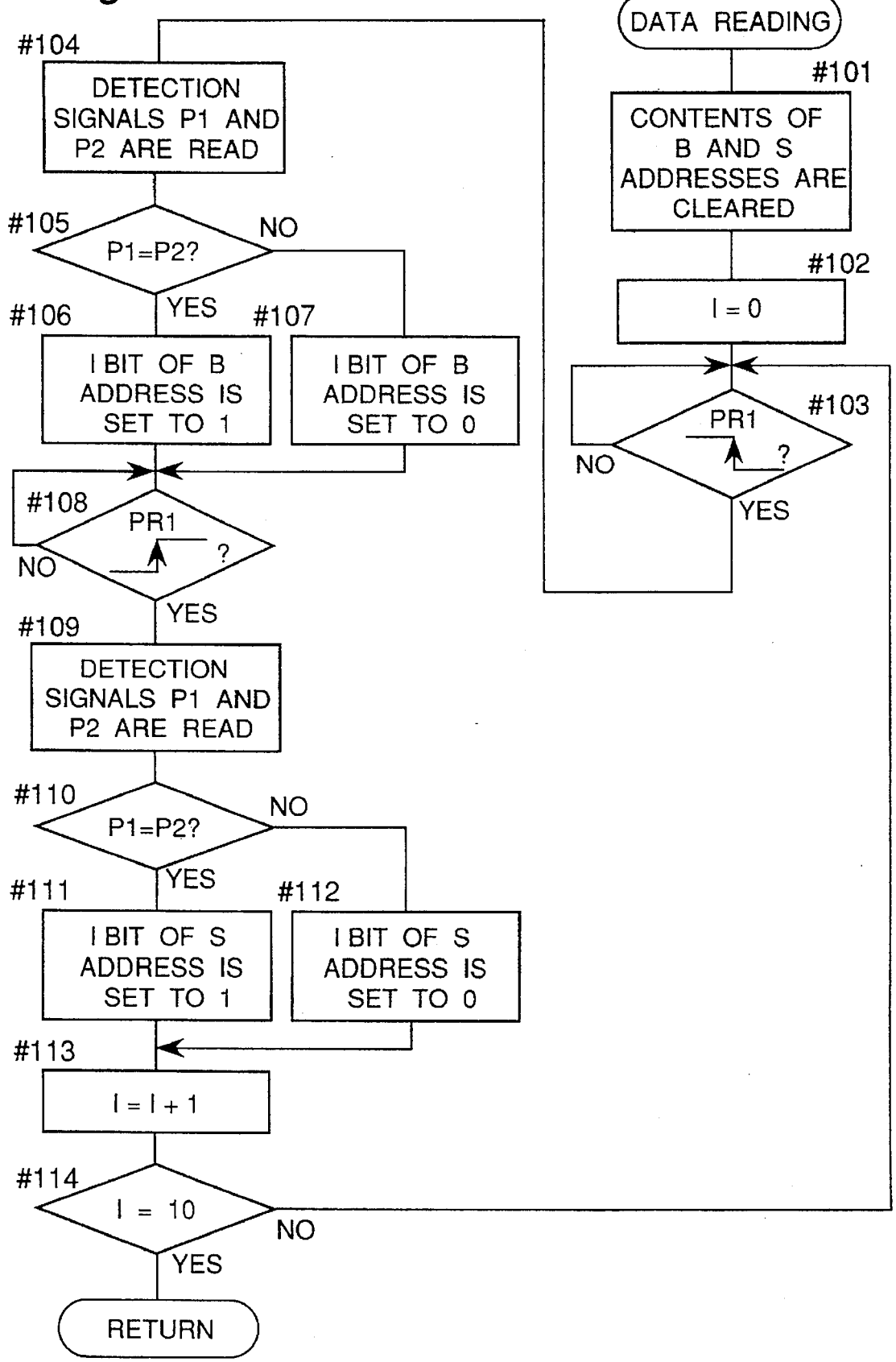
FIG. 17 is a flowchart showing an operation of reading the data of the data disk.

After the quiet zone 6d is detected, data of the disk 3 is read at step #82 of FIG. 15. The flowchart of FIG. 17 shows the method of reading the data. First, at step #101, the data of the bar 6a stored at a (B) address of a memory and that of the space 6b stored at an (S) address thereof are cleared. The operations of steps #103 through #113 are repeatedly performed until it is detected at step #114 that the number (I) of loops set to 0 at step #102 has become 10.

It is discriminated at step #103 whether or not the signal outputted from the photoreflector PR1 has changed from H level to L level because the edge of the bar 6a adjacent to the quiet zone 6d has passed the photoreflectors PR1. At step #104, the detection signals P1 and P2 outputted from each of the photoreflectors PR1 and PR2 are read. As described previously, since the photoreflector PR1 is disposed ahead of the photoreflector PR2 in the rotational direction of the disk 3, the edge of the bar 6a has already passed the photoreflector PR2. As described previously, the interval between the photoreflectors PR1 and PR2 is greater than the width of the narrow bar code 6a and smaller than the double of the width thereof. Consequently, if the levels of the detection signals P1 and P2 are equal to each other, the bar 6a can be detected as the wide one.

Figure 18A:
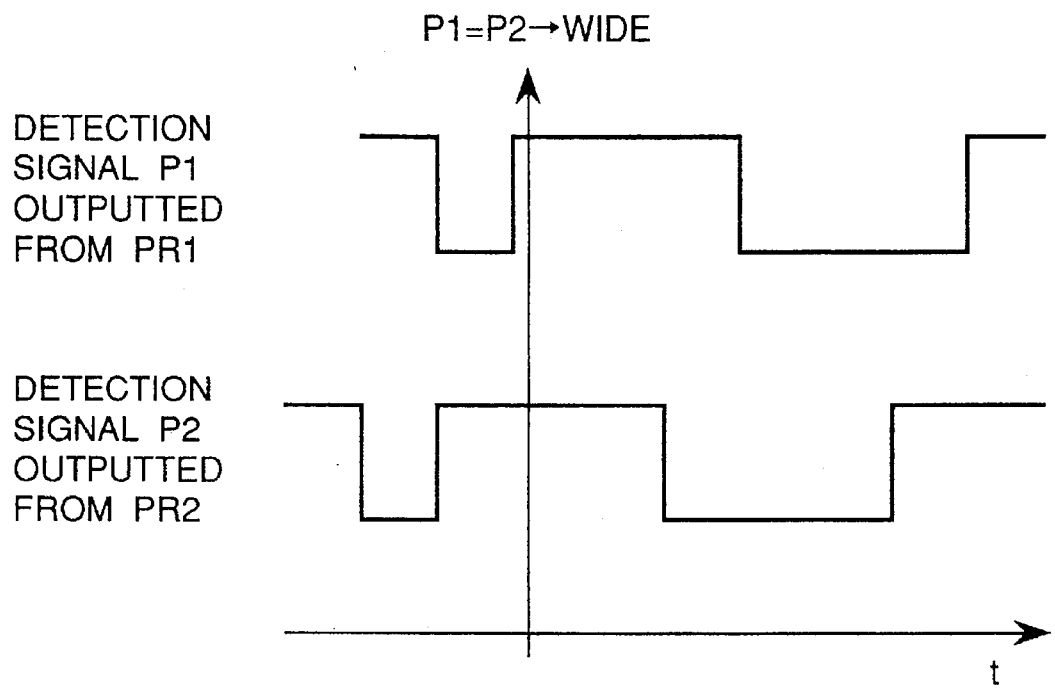
FIG. 18a and FIG. 18b are views showing signals outputted from two photoreflectors for detecting a data disk.
Figure 18B:
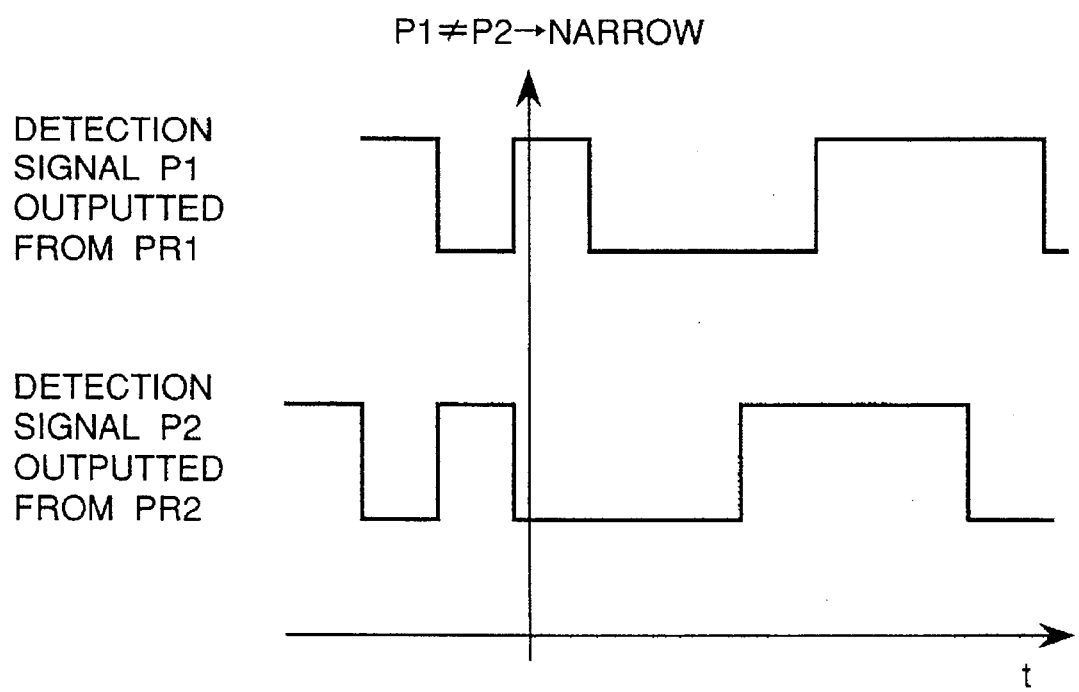
Figure 19:
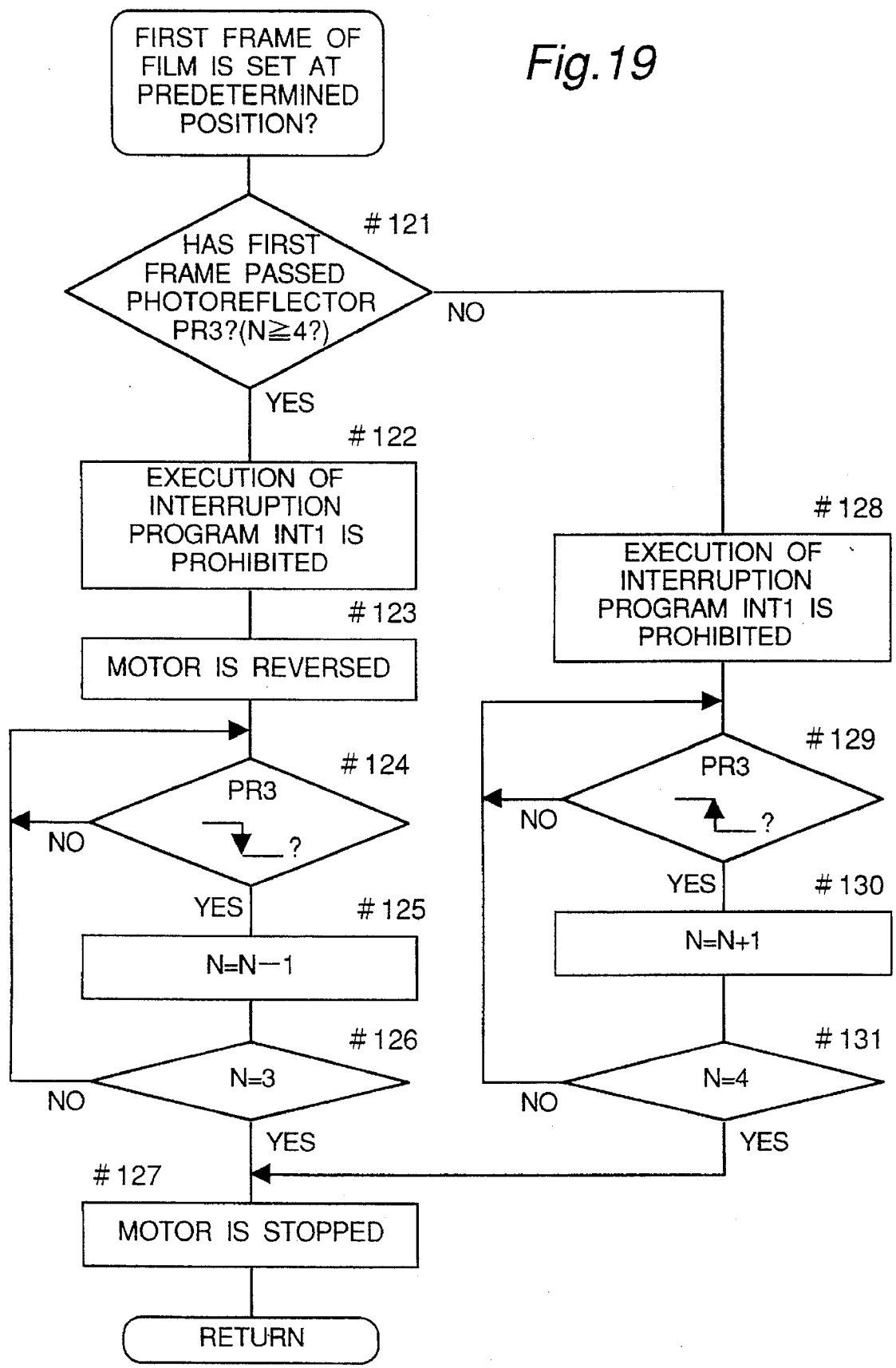
FIG. 19 is a flowchart showing an operation of setting the first frame of the film at a predetermined position.

FIGS. 18a and 18b show the above-described data reading operation. FIG. 18 shows that the timing the signals are outputted from the photoreflectors PR1 and PR2 are different from each other because the photoreflector PR1 is disposed ahead of the photoreflector PR2 in the rotational direction of the disk 3. For example, if the wide space 6b is detected by the photoreflector PR1, an H level signal is outputted from the photoreflectors PR1 and PR2, respectively as shown in FIG. 18a, while if the narrow space 6b is detected by the photoreflector PR1, an L level signal is outputted from the photoreflector PR2 as shown in FIG. 18b. It is decided at step #105 whether the level of the signal P1 and that of the signal P2 are equal to each other. If yes, i.e., if it is decided that the bar 6a is the wide one, (I) bit of the (B) address is set to 1 at step #106. If no at step #105, i.e., if it is decided that the bar 6b is the narrow one, (I) bit of the (B) address is set to 0 at step #107.

If it is decided at step #108 that the signal of the photoreflector PR1 has changed from L level to H level, the level of the signal outputted from each of the photoreflectors PR1 and PR2 is read again at step #109. It is discriminated at step #110 whether the level of the signal P1 and that of the signal P2 are equal to each other. If equal, (I) bit of the (S) address is set to 1 at step #111. If not equal, (I) bit of the (S) address is set to 0 at step #112. At step #113, 1 is added to the number of loops (I). The above operations are repeatedly executed until it is detected at step #114 that the number of loops (I) becomes 10, and all the data of the bar 6a and that of the space 6b are stored in the (B) address and the (S) address, respectively.

After the reading of the data of the disk 3 terminates, a parity check is executed at step #83 of FIG. 15. If "OK" is detected at step #84, the program goes to step #9 of FIG. 9 while if "NG" is detected at step #84, the operation of step #81 and the operations of the steps subsequent thereto are repeatedly executed. In this embodiment, even though the disk 3 rotates nonuniformly, the data of the disk 3 can be accurately read by comparing with each other the levels of the signals outputted from the photoreflectors PR1 and PR2 spaced a predetermined interval from each other.

After the data reading terminates, the first frame is set at the predetermined position at step #9 of FIG. 6. This operation is shown in detail by the flowchart of FIG. 19. First, it is discriminated at step #121 whether or not N≧4, i.e., it is discriminated whether or not the first frame of the film has passed the photoreflector PR3. If yes, i.e., if the film has been fed more than required, the film is rewound.

When this flow is being executed, i.e., when the reading of the data has been completed, it is unnecessary to execute the interruption program INT1 described previously with reference to FIG. 9. Thus, the execution of the interruption program INT1 is prohibited at step #122 and then, the motor (M) is reversed at step #123. It is detected at step #124 whether or not the level of the signal outputted from the photoreflector PR3 has changed from H level to L level. If changed, the value of N is decreased by 1 at step #125. When it is decided at step #126 that N=3, the motor (M) is stopped to set the first frame at the predetermined position at step #127. The reason why the motor (M) is stopped when N=3 is that N=4 in winding the film while N=3 in rewinding the film as shown in FIG. 8.

If it is decided at step #121 that N<4, an interruption is prohibited at step #128, and the motor (M) is stopped at step #131 when N=4 to set the first frame at the predetermined position. In this embodiment, when the film has been fed more than is required without reading the data, the interruption program INT1 is executed. Normally, data is read in preference to the detection of the position of the first frame even though the first frame has passed the predetermined position. That is, after the data is read, the position of the first frame is detected whether or not the first frame has been set at the predetermined position. If necessary, the film is rewound so that the first frame is returned to the predetermined position. Therefore, the data can be read more often and more accurately than the method of reading the data before the first frame is set at the predetermined position by winding the film.

Figure 20A:
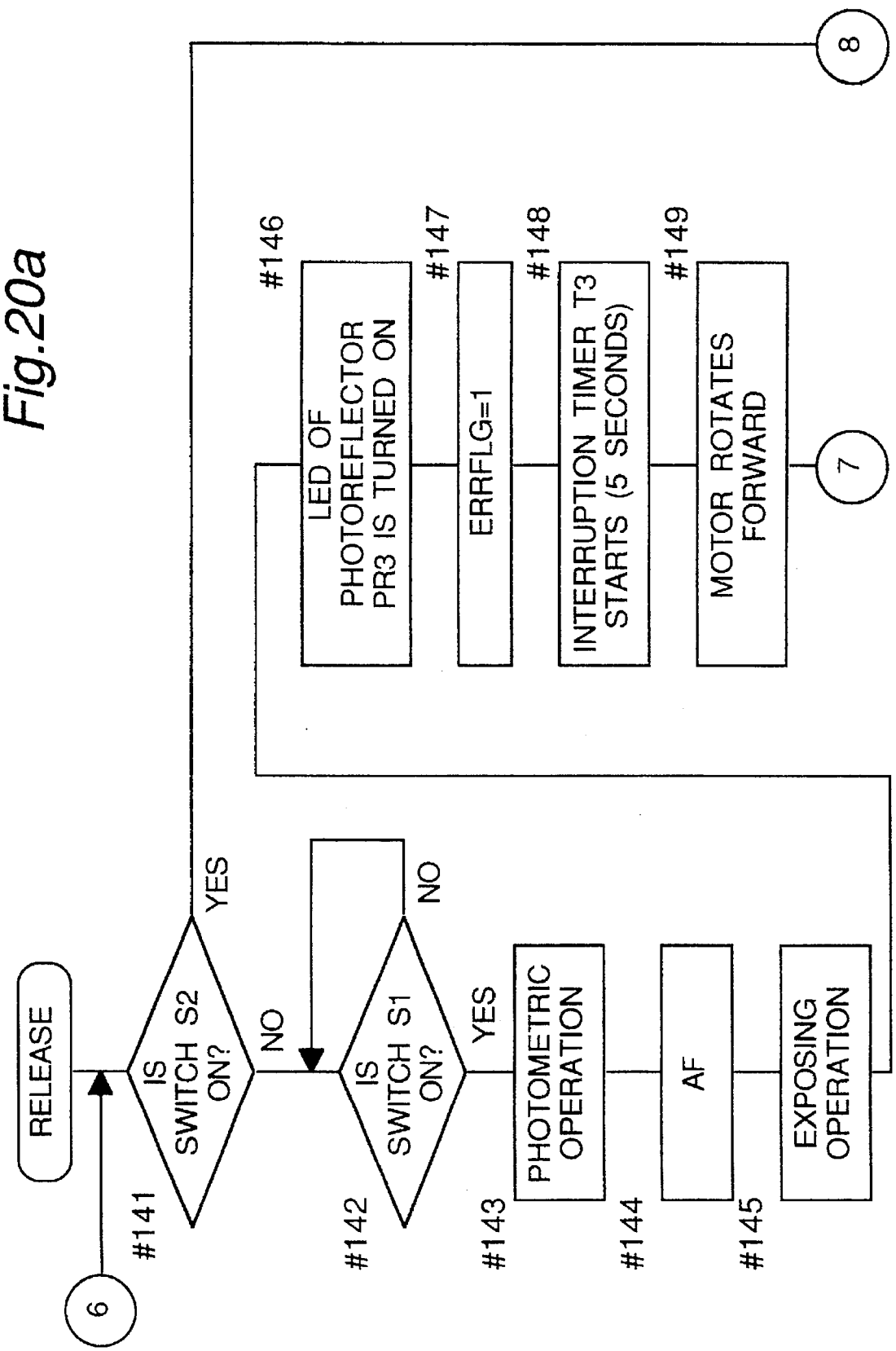
FIG. 20a and FIG. 20b are counterparts of a flowchart showing a release operation, with each line indicated by the same numeral through (6) to (8) to be connected together.
Figure 20B:
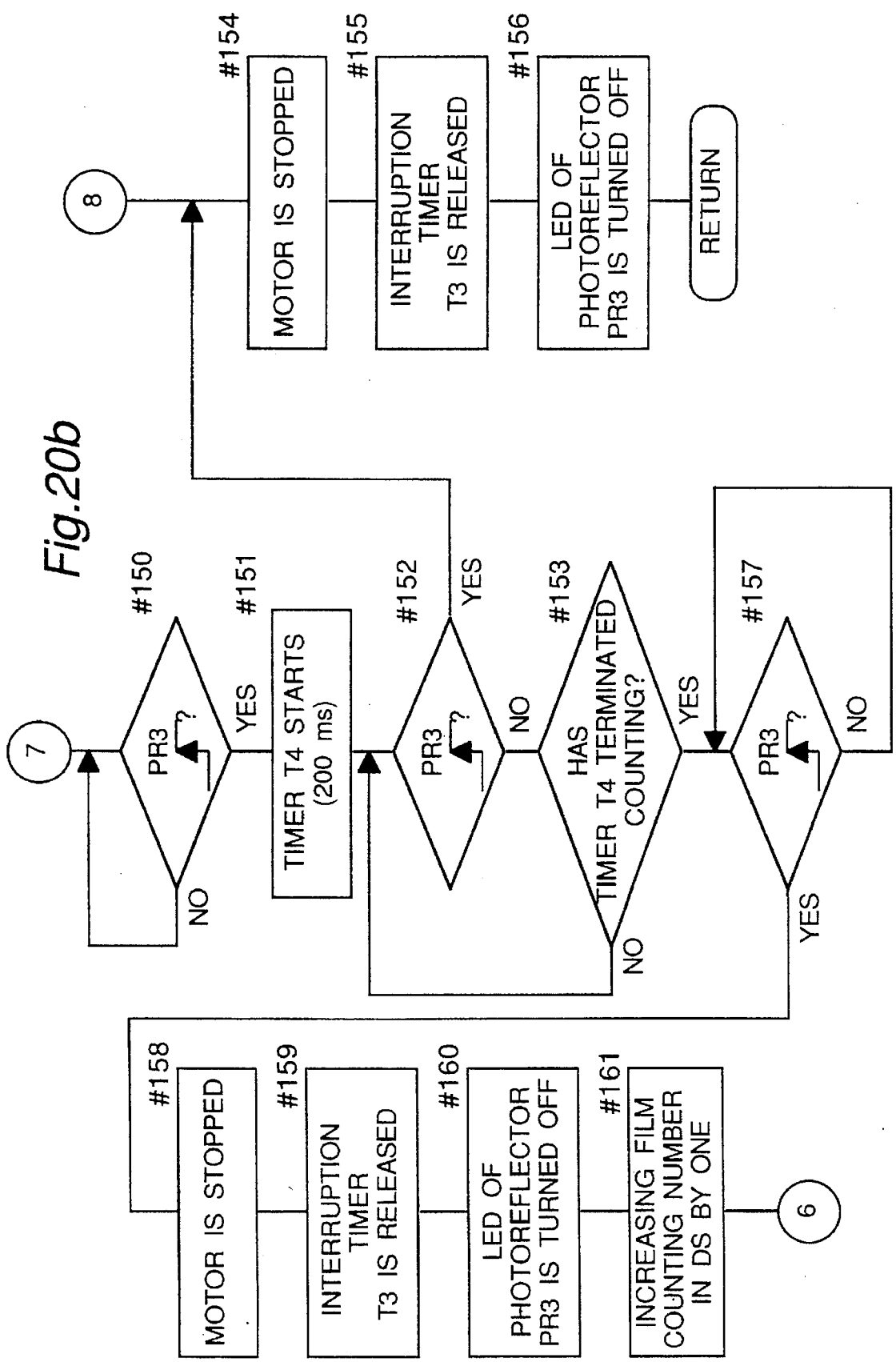

The release operation to be performed at step #10 is described below with reference to the flowchart shown in FIG. 20a and FIG. 20b. It is discriminated at step #141 whether or not the switch S2 is ON. If the switch S2 is not ON, it is discriminated at step #142 whether or not the release switch S1 is ON. If the switch S1 is ON, a photometric operation, an autofocusing operation, and an exposing operation are executed at steps #143, #144, and #145, respectively according to the program carried out as a subroutine. At steps #146 through 149, after the LED of the photoreflector PR3 is turned on, an error flag ERRFLG is set to 1, an interruption timer T3 of five seconds is started, and the motor (M) is rotated forward, respectively. It is to be noted that the error flag ERRFLG serves as a means for rewinding the film after an interruption occurs by setting the interruption timer T3 to 1 in setting the interruption timer T3 at the following step.

Figure 21:
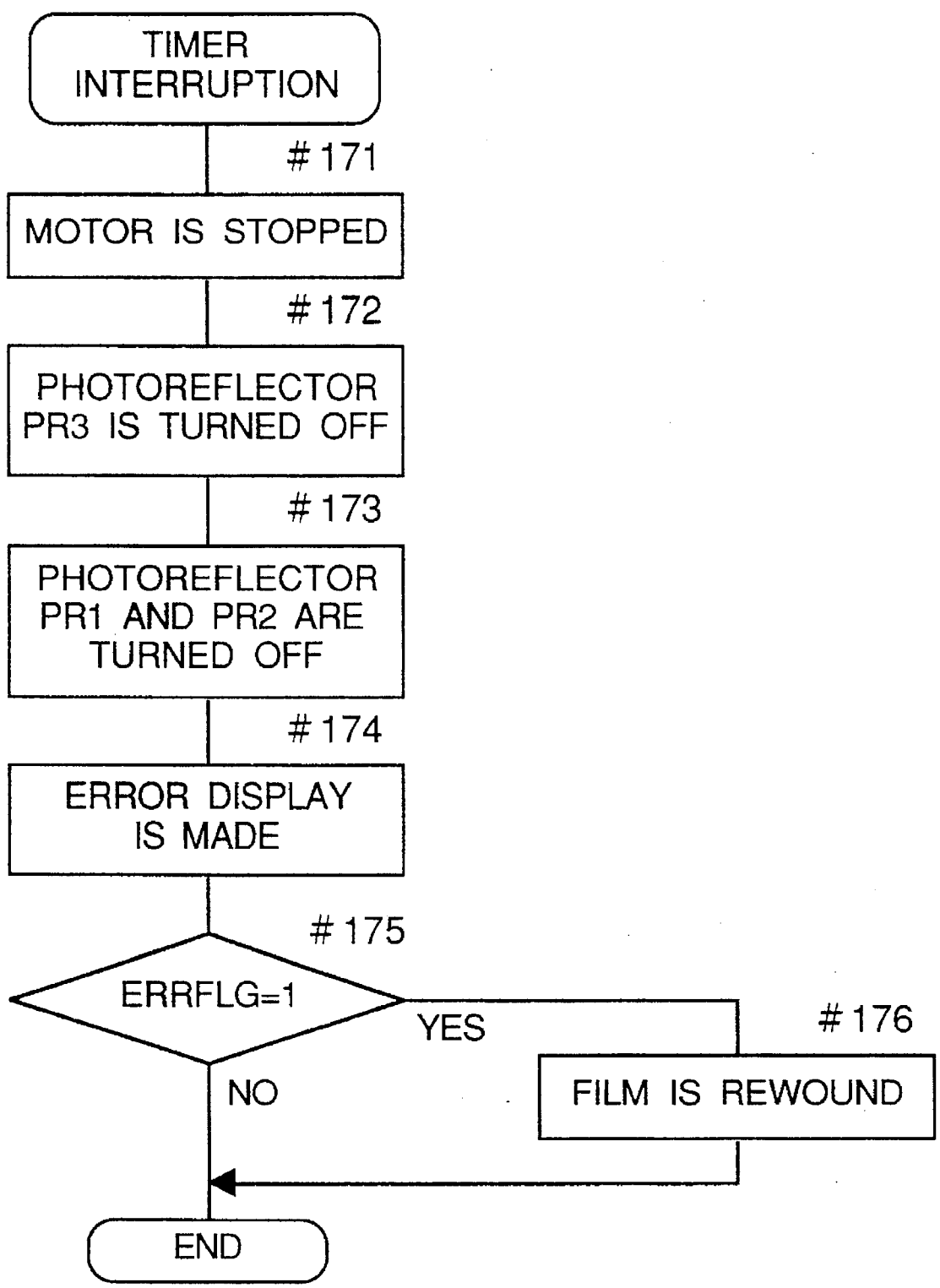
FIG. 21 is a flowchart showing an interruption by means of a timer.

FIG. 21 shows an operation, i.e. interruption, to be executed five seconds after the interruption timer T3 is set. That is, the motor (M) is stopped at step #171, the photoreflector PR3 is turned off at step #172, and the photoreflectors PR1 and PR2 are turned off at step #173. Then, at step #174, the occurrence of an error is displayed by the display device DS. It is discriminated at step #175 whether or not the error flag ERRFLG has been set to 1. If set, the film is rewound to terminate the operation at step #176. If it is decided that the error flag ERRFLG has not been set to 1, the function of the camera is stopped without rewinding the film.

When the interruption timer T3 is set and the motor (M) is rotated forward at steps #148 and #149, respectively, it is discriminated at step #150 whether the level of the signal outputted from the photoreflector PR3 has become H level to decide whether or not the first perforation 8a has passed the photoreflector PR3 in winding the film 8. Then, at step #151, a timer T4 of 200 ms is started when the first perforation 8a has passed the photoreflector PR3. Then, it is discriminated again at step #152 whether or not the level of the signal outputted from the photoreflector PR3 has changed from L level to H level before the timer T4 terminates counting at step #153.

The film-feeding mechanism is so constructed that it takes more than a time period of 200 ms for the second perforation 8b to pass the photoreflector PR3 after the first perforation 8a has passed the photoreflector PR3. It takes less than the time period of 200 ms for the end perforation 8e to pass the photoreflector PR3 after the perforation 8d has passed the photoreflector PR3. Accordingly, if it takes less than 200 ms for a succeeding perforation to pass the photoreflector PR3 after a preceding perforation has passed the photoreflector PR3, it is decided that the rear end of the film is at the predetermined position. Then, the program goes to step #154 at which the motor (M) is stopped. At step #155, the interruption timer T3 is released. At step #156, the LED of the photoreflector PR3 is turned off. Then, a film rewinding operation is started at step #11 of FIG. 6. If it is decided at step #141 that the switch S2 is ON, the operations of steps #154 through #156 are performed, and then, the film rewinding operation is started.

If it is decided that the second perforation 8b has not passed the photoreflector PR3 within 200 ms after the first perforation 8a passed the photoreflector PR3 and when it is detected at step #157 that the second perforation 8b has passed the photoreflector PR3, the motor (M) is stopped at step #158 to set the second frame at the predetermined position, the interruption timer T3 is released at step #159, and the photoreflector PR3 is turned off at step #160. Then, after increasing the film counting number in the display device by one, the program returns to step #141.

Figure 22:
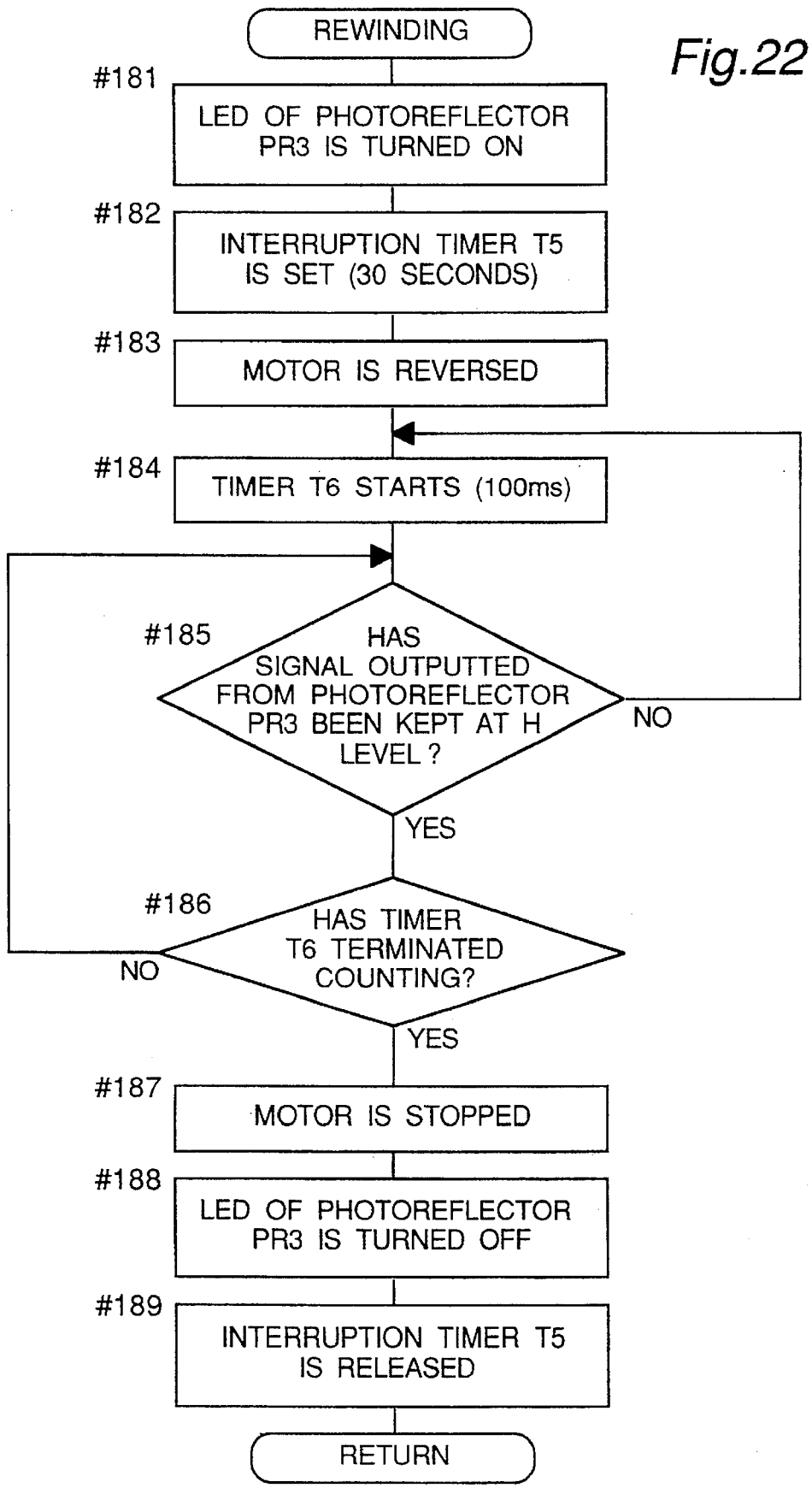
FIG. 22 is a flowchart showing an operation of rewinding the film.

In rewinding the film, the LED of the photoreflector PR3 is turned on at step #181 in FIG. 22. At step #182, a timer T5 of 30 seconds is set. At step #183, the motor (M) is reversed. At step #184, a timer T6 of 100 ms is started. When the signal outputted from the photoreflector PR3 is kept at H level for more than 100 ms (steps #185 and #186), the motor (M) is stopped at step #187. This is because perforations pass the photoreflector PR3 quickly; that is, when the output of the signal of H level outputted from the photoreflector PR3 is kept for more than 100 ms, it can be decided that the leading end of the film has been rewound into the cartridge 1. Then, the LED of the photoreflector PR3 is turned off at step #188, the interruption timer T5 is released, and the program goes to the subroutine of setting (step #12 of FIG. 6) the stop position of the spool 2. When an interruption occurs by means of the interruption timer T5, operations similar to those of the flowchart of FIG. 21 are executed. The subroutine of FIG. 22 therefore causes the microcomputer to operate as a drive controller for rewinding the film.

Figure 23:
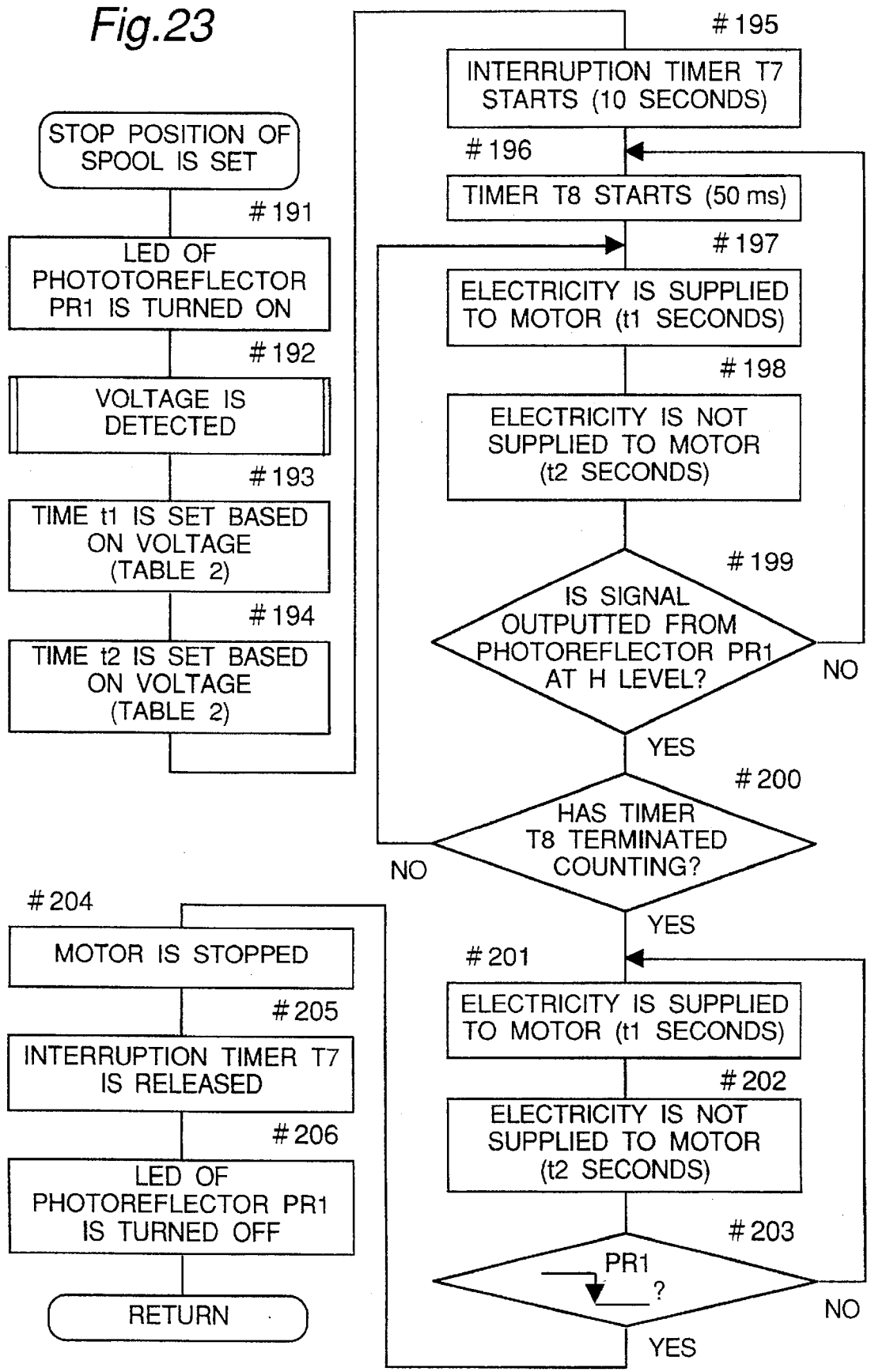
FIG. 23 is a flowchart showing an operation of setting the stop position of a spool.
Figure 24:
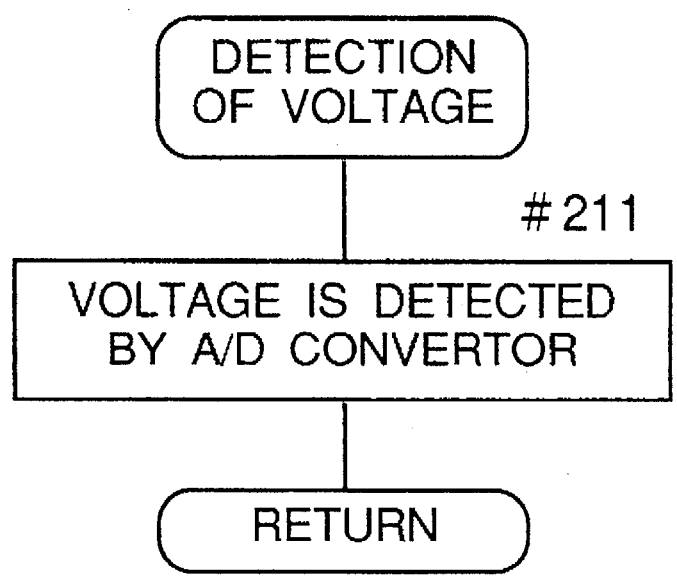
FIG. 24 is a flowchart showing an operation of detecting a voltage.

The flowchart of FIG. 23 shows in detail the operation of setting the stop position of the spool 2 to be executed when all the frames have been exposed. First, at step #191, the LED of the photoreflector PR1 is turned on. At step #192, the supply voltage is detected. The supply voltage is detected according to the number of pulses obtained by the A/D conversion made by the microcomputer COM and based on Table 1 shown below, as shown at step #211 of FIG. 24.

TABLE 1

| A/D | voltage (V) |
| --- | --- |
| ~ 80 | ~ 4.5 |
| 80 ~ 100 | 4.5 ~ 5.0 |
| 100 ~ 120 | 5.0 ~ 5.5 |
| 120 ~ 140 | 5.5 ~ 6.0 |
| 140 ~ | 6.0 ~ |

A pulse duration is modulated based on a detected voltage so as to control (PWM control) the number of rotations of the motor (M). In order to keep the number of rotations of the motor (M) constant regardless of whether the supply voltage is low or high, a period of time t1 in which electricity is supplied to the motor (M) and the period of time t2 in which electricity is not supplied thereto are set at steps #193 and #194, respectively. The time periods t1 and t2 are set based on Table 2 shown below. For example, when a detected voltage ranges from 5 to 5.5 volts, the time periods t1 and t2 are set to 500 μs and 200 μs, respectively.

TABLE 2

| voltage (V) | duty ratio | |
| --- | --- | --- |
| | t1(μs) | t2(μs) |
| ~ 4.5 | 500 | 0 |
| 4.5 ~ 5.0 | 500 | 100 |
| 5.0 ~ 5.5 | 500 | 200 |
| 5.5 ~ 6.0 | 500 | 300 |
| 6.0 ~ | 500 | 400 |

At step #195, an interruption timer T7 of 10 seconds is set. At step #196, a timer T8 of 50 ms for checking whether or not the signal outputted from the photoreflector PR1 is kept at H level for a predetermined period of time is started. Until the level of the signal outputted from the photoreflector PR1 is H at step #199, electricity is supplied (rewinding direction) and not supplied to the motor (M) repeatedly at steps #197 and #198, respectively. Even though the voltage drops at this time, the number of rotations of the motor (M) is kept equal to that obtained when the voltage does not drop. After it is detected at step #200 that the output of the signal of H level from the photoreflector PR1 has been kept for a time period of 50 ms, the motor (M) is stopped at step #204 when the signal of the photoreflector PR1 has changed from H level to L level as a result of the quiet zone 6d passing by the photoreflector PR1 through steps #201 to #204. It is to be noted that the signal of H level is outputted from the photoreflector PR1 for more than the time period 50 ms continuously only in the quiet zone 6d. At steps #205 and #206, the interruption timer T7 is released and the LED of the photoreflector PR1 is turned off. Then, the operation terminates.

If some frames of the film have been exposed, a part of the operations of steps #196 through #203 are altered to stop the motor (M) due to the change of the signal outputted from the photoreflector PR1 from L level to H level after the signal has kept L level for a time period of 70 ms. In this manner, the spool 2 can be stopped so that the arrow 5 of the data disk 3 points to the mark 7b (MRI) on the casing 4. This construction allows the number of rotations of the motor (M) to be constant regardless of whether the voltage has dropped or not. Accordingly, the arrow 5 can be prevented from being greatly dislocated from the position of FRESH and MRI. The number of rotations of the motor (M) can be controlled not only by the modulation of pulse duration, but also by changing the driving voltage of the motor (M), choosing a special set of gears from a certain gear system comprising a number of gears with different ratios, etc.

As described above, the stop position of the spool 2 is set by stopping the motor (M) when the photoreflector PR1 has detected the edge of the quiet zone 6d or that of the black zone 6c. This embodiment has a feature in the arrangement of the photoreflectors PR1 and PR2 as will be described below, so as to provide accurate exposed/unexposed indication to a film.

With reference to FIG. 2, the spool 2 rotates to a small extent by inertia after the motor (M) is stopped. Therefore, in case that the photoreflector PR2 is installed in the position corresponding to the edge of the black zone 6c of the edge of the quiet zone 6d with the display mark 7b or 7c corresponding to the arrow 5 of the data disk 3, the display marks 7b or 7c may be dislocated from the arrow 5 when the disk 3 has stopped. In order to overcome this problem, in this embodiment, the photoreflectors PR1 and PR2 are disposed upstream in the rotational direction of the disk 3 by an angle 8, with respect to the point at which the motor (M) rotating at a constant speed by PWM control is stopped. The disk 3 rotates angle 8 by inertia after the motor (M) is stopped. In this manner, a stop signal (edge of the black zone 6c or the edge of the quiet zone 6d) of the disk 3 is detected upstream of the position at which the motor (M) has stopped. Accordingly, in this embodiment, owing to PWM control and the favorable positioning of the photoreflectors PR1 and PR2, whether or not the film has been exposed can be accurately displayed when the film has been rewound. Thanks to the rotational speed of the disk 3 and that of the spool 2 controlled by PWM control and the above-described arrangement of the photoreflectors PR1 and PR2, the disk 3 can be stopped at an accurate position compared with the prior art.

Figure 25:
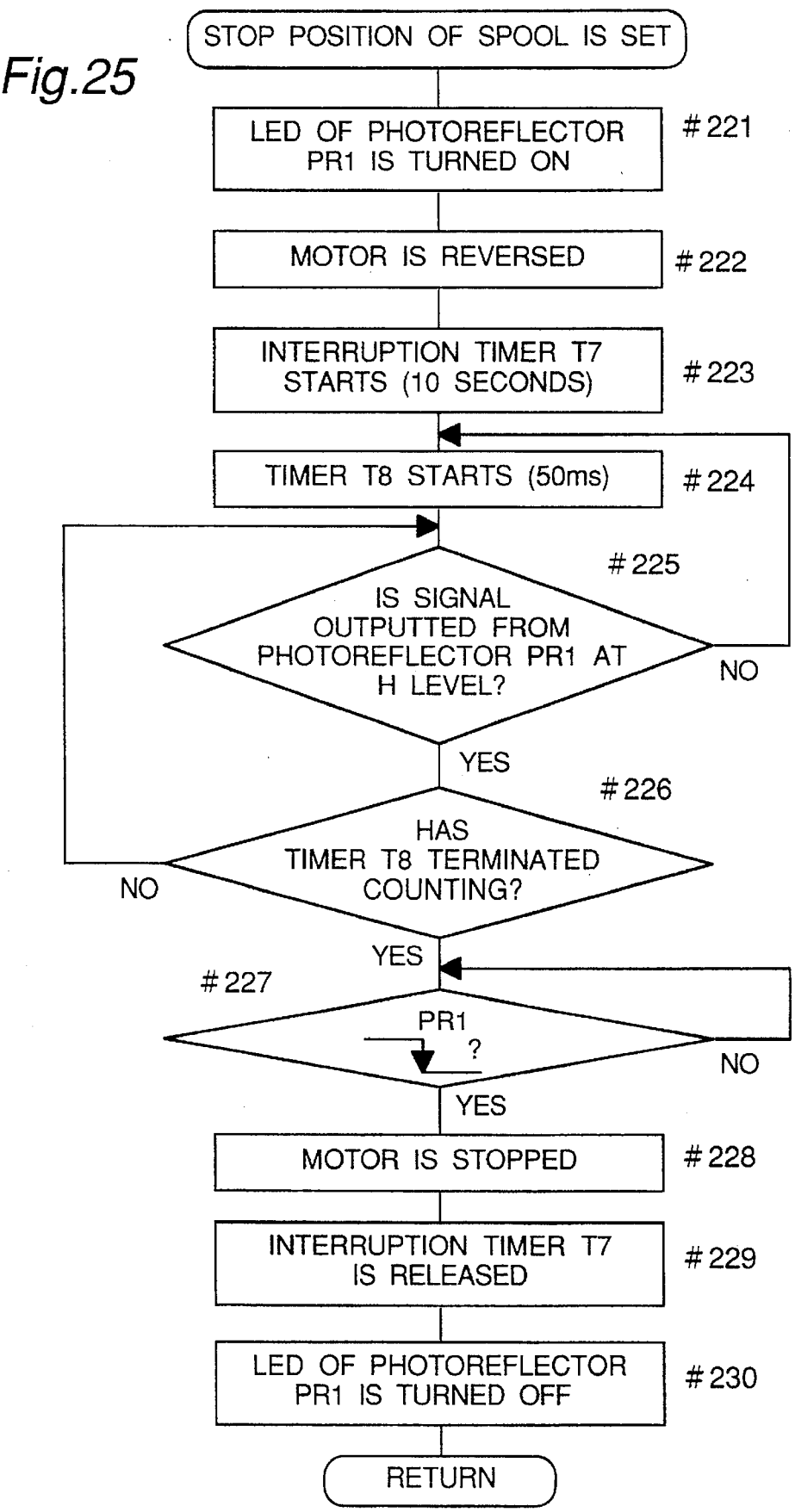
FIG. 25 is a modification of flowchart showing the operation of setting the stop position of the spool.
Figure 26:
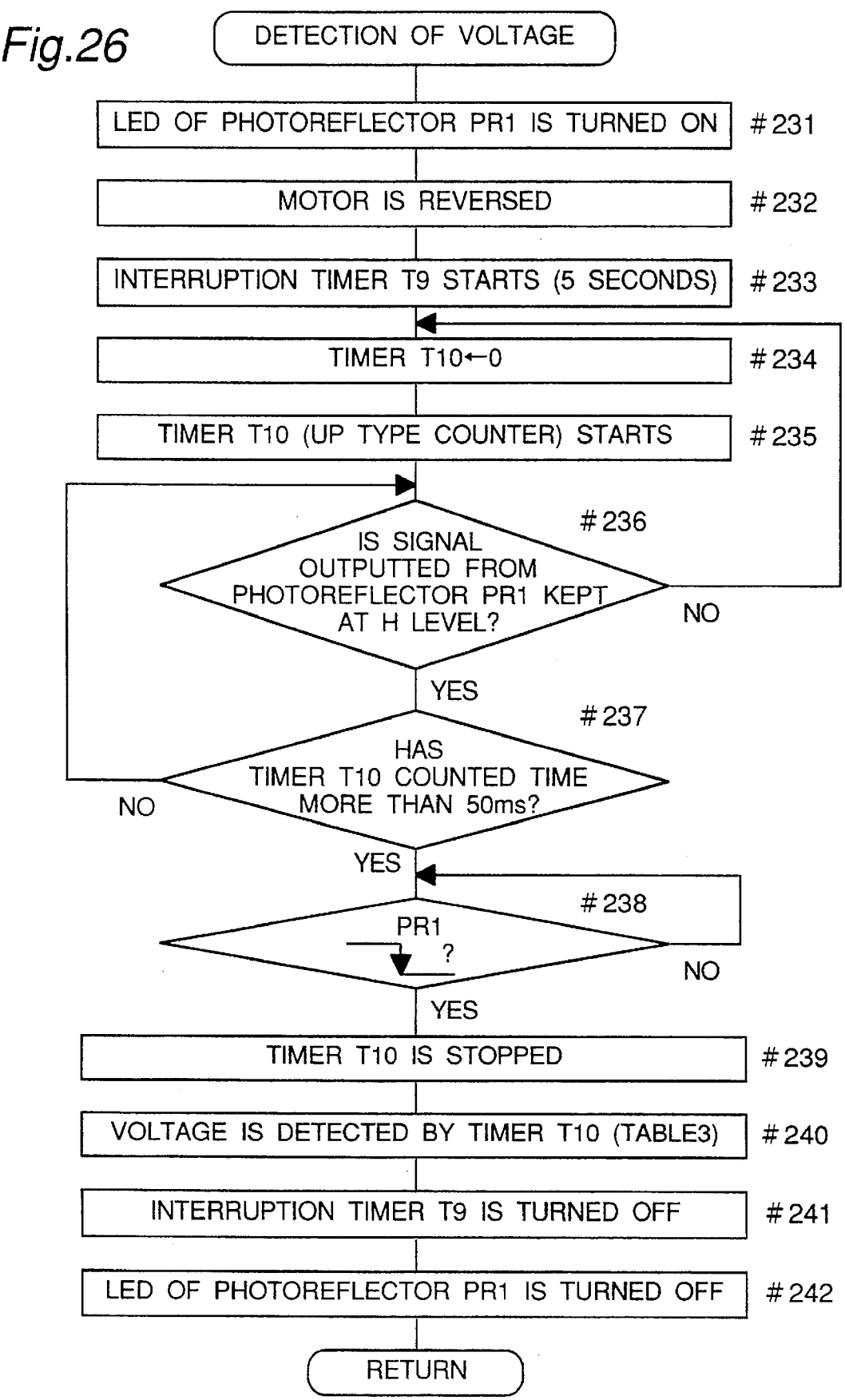
FIG. 26 is a modification of flowchart showing the operation of detecting a voltage.
Figure 27:
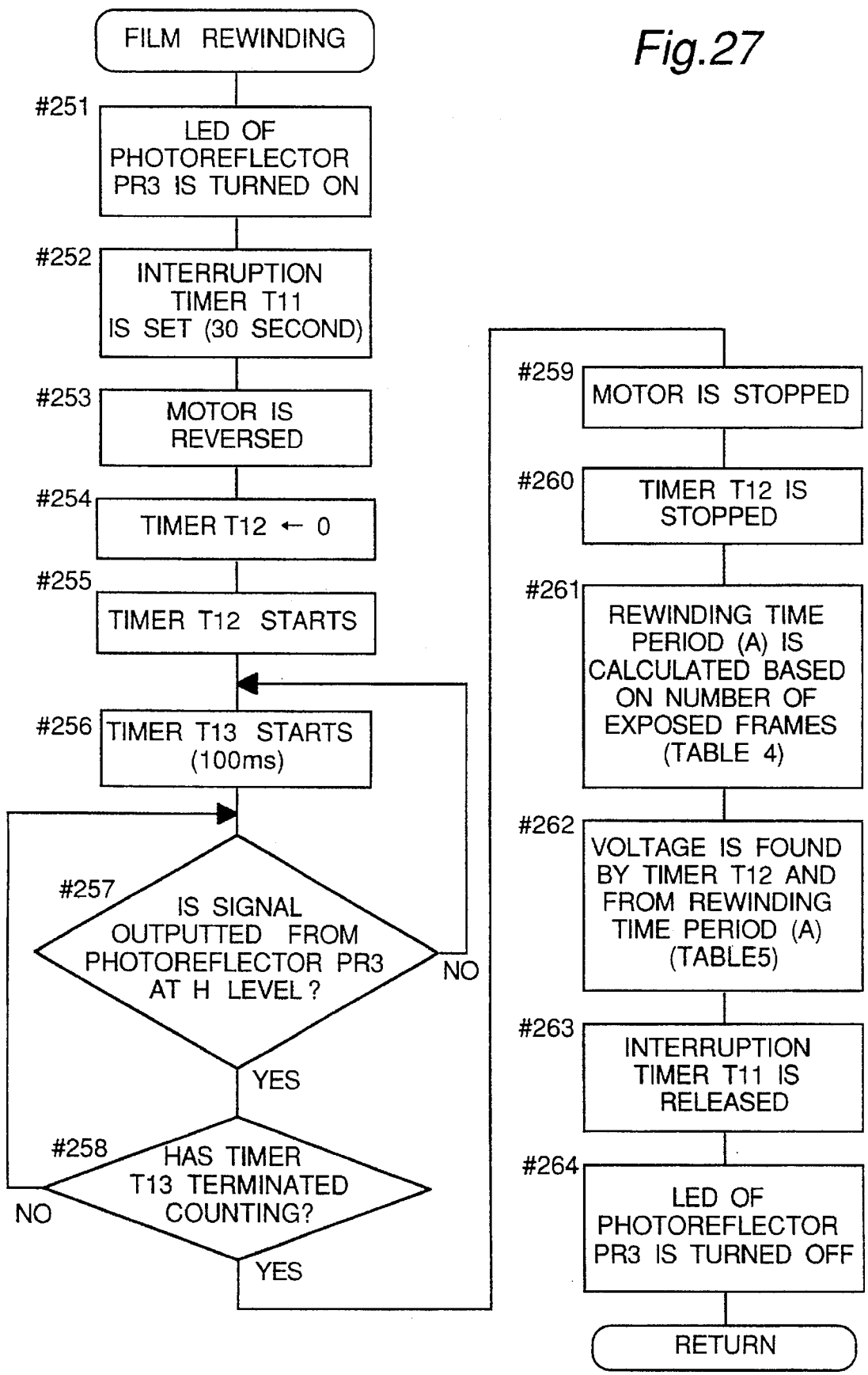
FIG. 27 is a modification of flowchart showing the operation of rewinding the film.

The setting of the stop position of the spool 2 without performing PWM control is described below with reference to the flowchart of FIG. 25, on the supposition that all the frames have been exposed. According to this method, at step #221, the LED of the photoreflector PR1 is switched on. At step #222, the motor (M) is reversed. At step #223, the interruption timer T7 of 10 seconds is started. At step #224, a timer T8 of 50 ms for detecting the quiet zone 6d is started. It is detected at step #225 whether or not the level of the signal outputted from the photoreflector PR1 is H. It is detected at step #226 whether or not the output of the signal of H level is kept for the time period of 50 ms. At steps #227 and #228, the motor (M) is stopped when the quiet zone 6d has passed photoreflector PR1. At step #229, the interruption timer T7 is released. At step #230, the LED of the photoreflector PR1 is stopped. In this manner, this operation terminates.

The arrangement of the photoreflectors PR1 and PR2 allows whether or not the film is exposed to be accurately displayed and prevents an erroneous detection thereof from occurring. It is to be noted that since the cartridge 1 is used as a standardized article, it is unpreferable to change the position of the display marks 7a, 7b, and 7c. It is preferable to change the position of the photoreflectors in consideration of the compatibility of the cartridge.

A modification of the camera according the above-described embodiment is described below. Another method for detecting a voltage at step #192 in setting the stop position of the spool 2 shown in FIG. 23 is described below with reference to FIG. 26.

A voltage is detected based on a time period required for the quiet zone 6d to pass the photoreflector PR1. That is, at step #231, the LED of the photoreflector PR1 is switched on. At step #232, the motor (M) is reversed. At step #233, an interruption timer T9 of five seconds is set. At step #234, an initial value 0 is set on a timer T10 of increase type (numerical value of counter increases with the elapse of time). At step #235, the timer T10 is started. It is discriminated at step #236 whether or not the level of the signal outputted from the photoreflector PR1 is H. It is discriminated at step #237 whether or not the output of the signal of H level is kept for more than a time period of 50 ms. As described previously, the output of the signal of H level is kept for more than the time period of 50 ms only when the quiet zone 6d has passed the photoreflector PR1. Accordingly, at step #238, the rear end of the quiet zone 6d is detected based on the change of the signal from H level to L level immediately after the output of the signal of H level has been kept for more than the time period of 50 ms. Then, at step #239, the timer T10 is stopped to read the time. At step #240, the voltage is decided based on the time of the timer T10 and Table 3 shown below. The interruption timer T9 is switched off at step #241, and the LED of the photoreflector PR1 is switched off at step #242. Then, the program goes to step #193 and steps subsequent thereto of FIG. 23. In this manner, the stop position of the spool 2 can be set with the number of rotations of the motor (M) kept at a constant value by means of PWM control.

TABLE 3

| timer (ms) | voltage (V) |
| --- | --- |
| 84 ~ | ~ 4.5 |
| 76 ~ 84 | 4.5 ~ 5.0 |
| 68 ~ 76 | 5.0 ~ 5.5 |
| 60 ~ 68 | 5.5 ~ 6.0 |
| ~ 60 | 6.0 ~ |

In addition to the detection of the voltage based on the passing time of the quiet zone 6d with respect to the photoreflector PR1, it is possible to detect the voltage by using the passing time of the black zone 6c with respect to the photoreflector PR1, based on the period of time required for the disk 3 to make one turn, or based on the period of time required for the frame of the film 8 to be fed.

Furthermore, the voltage may be detected by other methods. For example, it is possible to rewind the film 8 according to the flowchart in FIG. 27 and to detect the voltage from the time required Go rewind it. That is, at step #251, the photoreflector PR3 is turned on. At step #252, an interruption timer T11 of 30 seconds is set. At step #253, the motor (M) is rotated in the film-rewinding direction. At step #254, an initial value is set on a value-increase type timer T12. At step #255, the timer T12 is started. At step #256, a timer T13 of 100 ms is started. At steps #257, #258, and #259, the motor (M) is stopped when it is decided that the H level signal has been outputted from the photoreflector PR3 continuously for a time period of 100 ms. At step #260, the timer T12 is stopped. The time period (A) required to rewind the film by the number of exposed frames is found at step #261 based on Table 4 shown below, and the voltage is found based on the relationship between the time of the timer T and the time period (A).

TABLE 4

| number of frames exposed | S (sec) |
| --- | --- |
| 1 | 3.0 |
| 2 | 3.5 |
| 3 | 4.0 |
| 4 | 4.5 |
| 5 | 5.0 |
| . | . |
| . | . |
| . | . |
| 33 | 19.0 |
| 34 | 19.5 |
| 35 | 20.0 |
| 36 | 20.5 |

TABLE 5

| timer (s) | voltage |
| --- | --- |
| 1.2A ~ | ~ 4.5 |
| 1.0A ~ 1.2A | 4.5 ~ 5.0 |
| 0.8A ~ 1.0A | 5.0 ~ 5.5 |
| 0.6A ~ 0.8A | 5.5 ~ 6.0 |
| ~ 0.6A | 6.0 ~ |

Then, at step #263, the interruption timer T11 is released. At step #264, the LED of the photoreflector PR3 is switched off to terminate the film-rewinding operation. If it takes more than 30 seconds to rewind the film in this flow, the interruption timer works and the function of the camera is stopped after the occurrence of an error is displayed. The detection of the voltage in rewinding the film 8 eliminates the need for a voltage detection during the operation of setting the stop position of the spool 2.

In the embodiment and the modification described above, two photoreflectors R1, R2 for detecting the data of the disk 3 are used. But the use of only one photoreflector also allows the data reading shown at step #8 of FIG. 6 to be accomplished. In addition, it is possible to execute the operation of the subroutine of setting the interruption shown at step #5 and that of the subroutine of waiting for the stabilization of the disk 3 shown at step #7 by a different operation. A modification thereof is described below.

Figure 28:
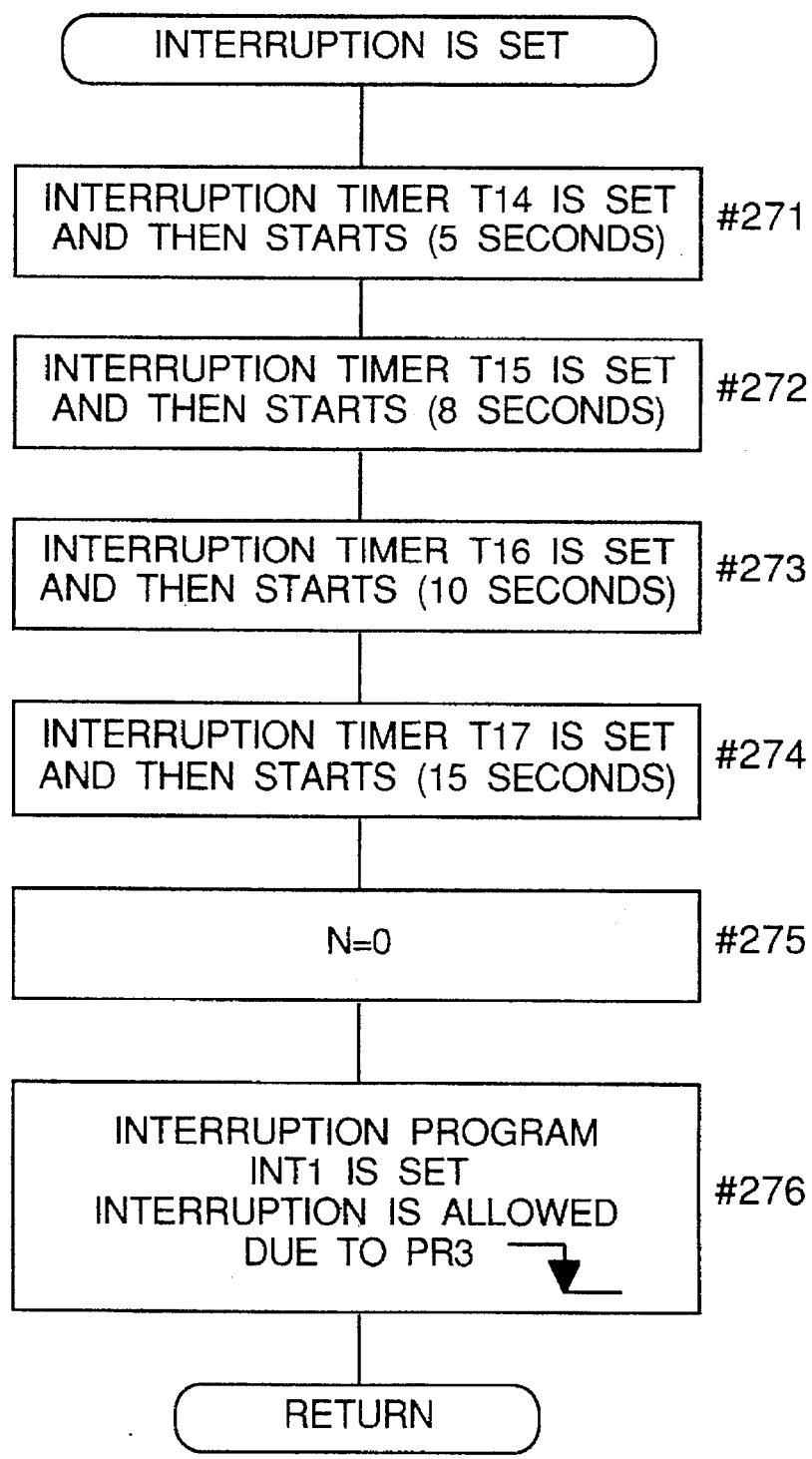
FIG. 28 is a modification of flowchart showing the operation of setting an interruption.
Figure 29:
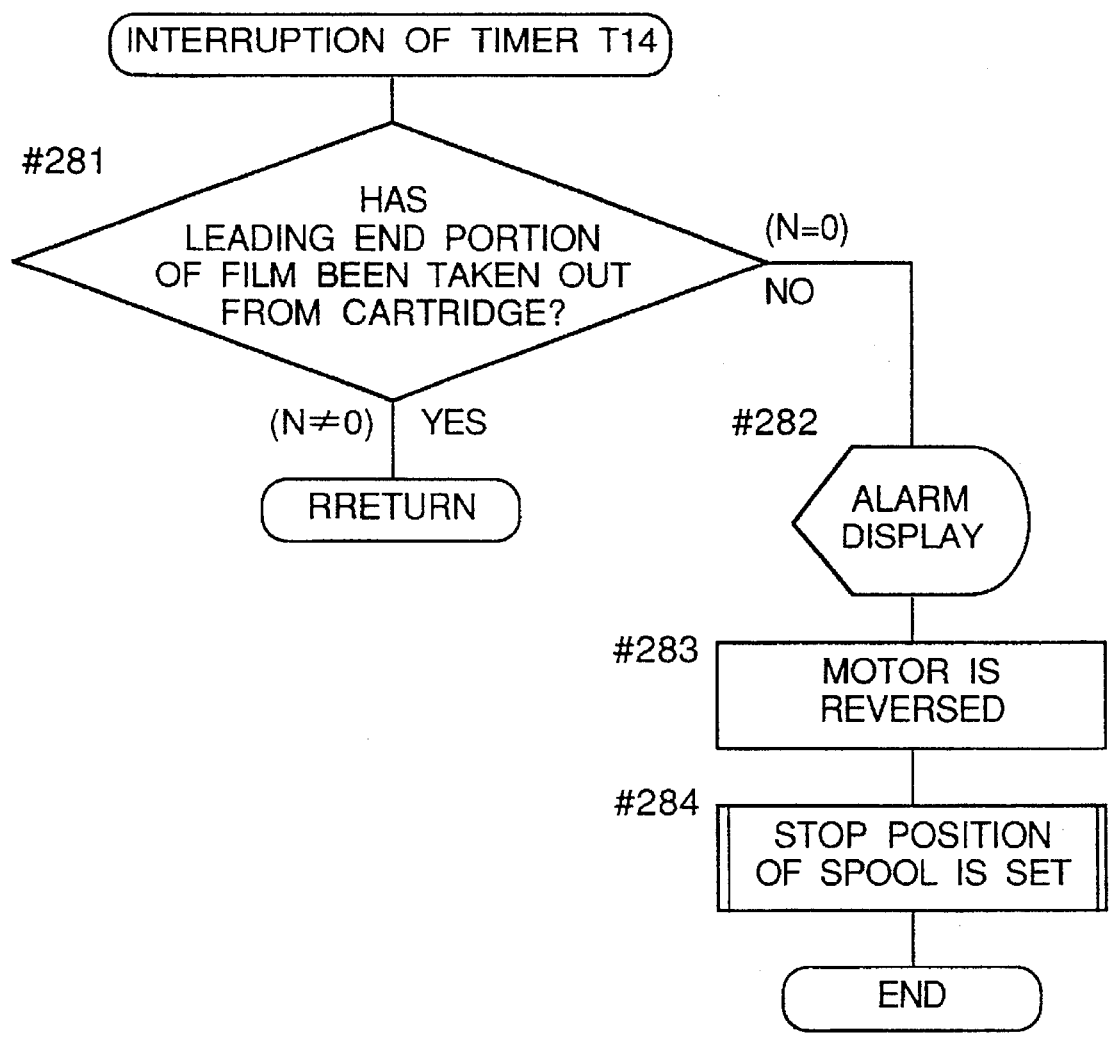
FIG. 29 is a flowchart showing an interruption by means of a timer.

The interruption can be set according to the flowchart shown in FIG. 28. In this flowchart, at steps #271 through #274, interruption timers T14 through T17 which start an interruption in five seconds, eight seconds, 10 seconds, and 15 seconds are set and then started. At step #275, N showing the number of changes in the level of the signal outputted from the photoreflector PR3 described with reference to FIG. 8 is set to 0. At step #276, similar to the operation performed with reference to FIG. 8, the interruption program INT1 is set so that the interruption program INT1 can be executed when the level of the signal outputted from the photoreflector PR3 has changed from H level to L level, i.e., when it is detected that the leading end of the film 8 has passed the photoreflector PR3 in the initial loading of the film 8. The interruption program INT1 is the same as that described with reference to FIG. 9. When the film 8 has been fed more than is required without reading data, the film 8 is rewound and the stop position of the spool 2 is set.

The interruption operation by means of the timers T14 through T17 set in this flow is described below. The interruption by means of the timer T14 is executed when the leading end of the film 8 has not been fed out from the cartridge even though five seconds elapses after the timer T14 is set. That is, it is discriminated at step #281 in FIG. 29 based on the value of N whether or not the leading end of the film 8 has been fed out from the cartridge in five seconds after the timer T14 is set. If not fed out, i.e., if the level of the signal remains unchanged and thus N=0, an alarm display is made at step #282, the motor (M) is reversed at step #283, and the spool 2 is stopped so that the arrow 5 of the disk 3 points to MRI at step #284. At this time, the operation terminates. If fed out at step #281, the subsequent operations suspended due the execution of this program are executed.

Figure 30:
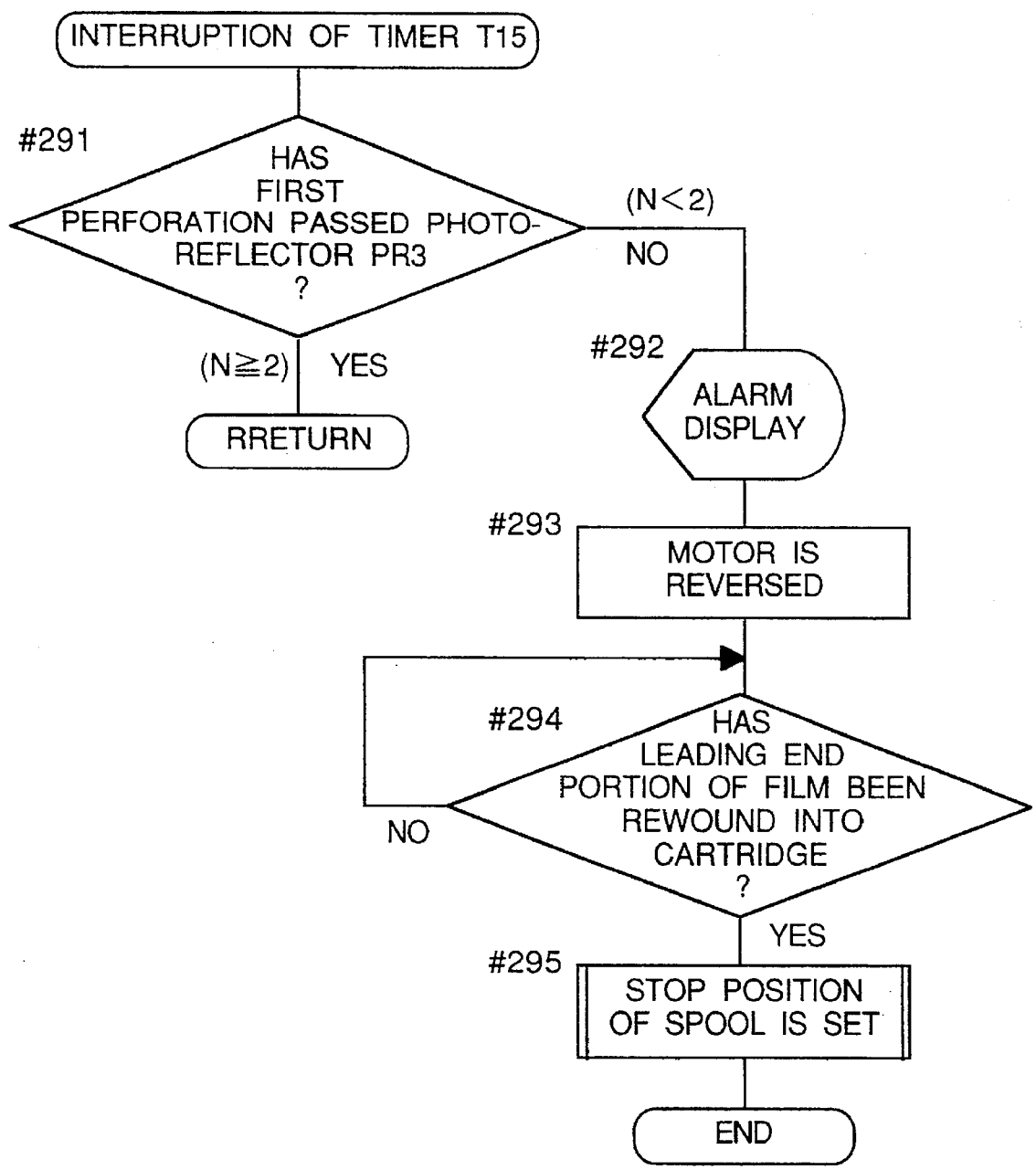
FIG. 30 is a flowchart showing an interruption by means of a timer.

An interruption by means of the timer T15 occurs when the first perforation 8c has not passed the photoreflector PR3 in eight seconds after the timer T15 is set. That is, it is discriminated at step #291 whether or not the first perforation 8c has passed the photoreflector PR3 in eight seconds after the timer T15 is set as shown in FIG. 30. If not passed (N<2), an alarm display is made at step #292, and the motor (M) is reversed at step #293. Then, it is discriminated at step #294 whether or not the leading end of the film has been wound around the spool 2. If wound, the spool 2 is stopped at a position of MRI to which the arrow 5 of the disk 3 has pointed at step #295 so as to terminate the operation. If it is decided at step #291 that the first perforation 8c has passed the photoreflector PR3, the subsequent operations suspended due the execution of this program are executed.

Figure 31:
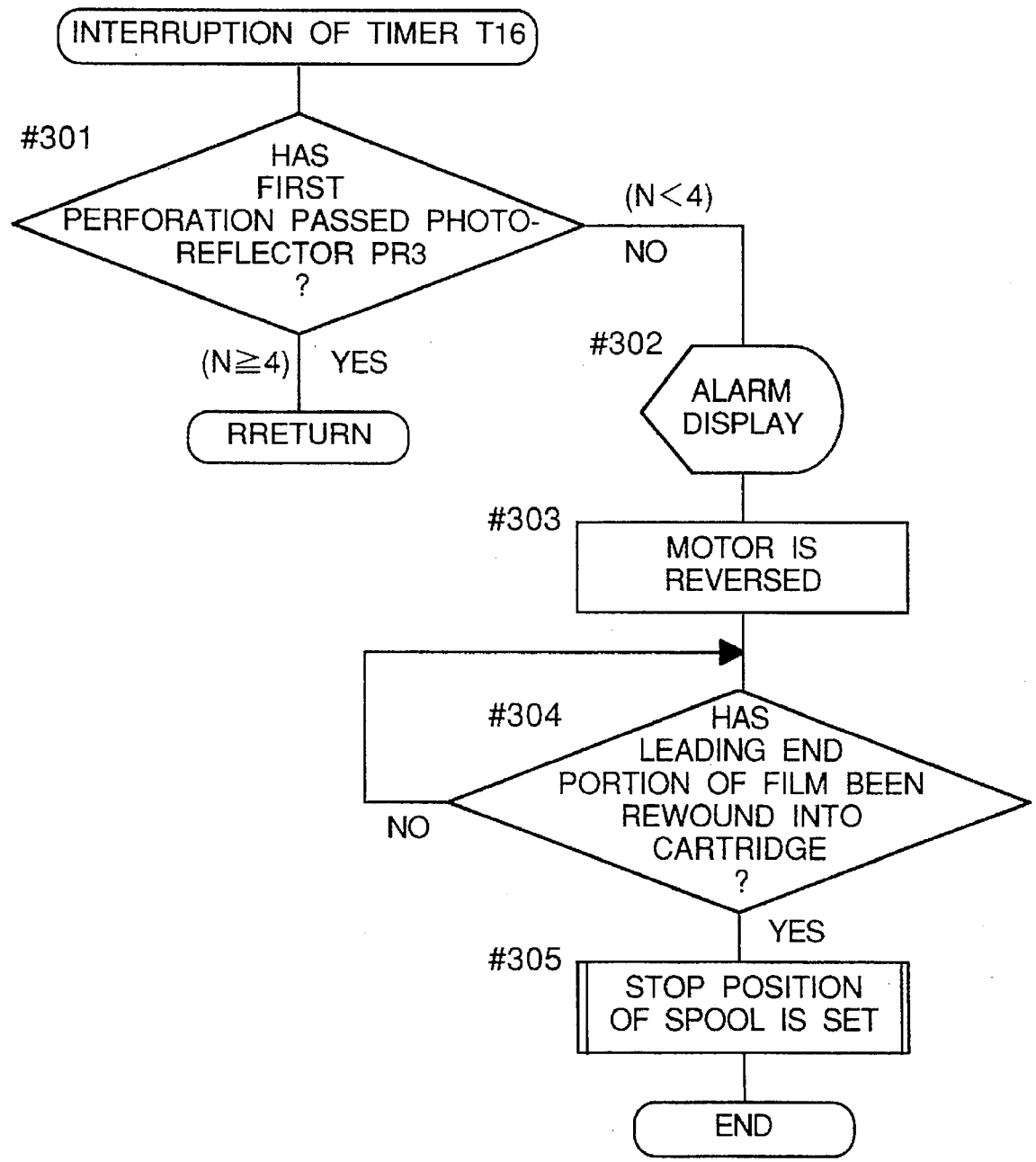
FIG. 31 is a flowchart showing an interruption by means of a timer.

An interruption by means of the timer T16 takes place when the first frame of the film 8 has not passed the photoreflector PR3 in ten seconds after the timer T16 is set. That is, it is detected at step #301 based on the value of N whether or not the first perforation has passed the photoreflector PR3 in 10 seconds after the timer T16 is set as shown in FIG. 31. If no (N<4), an alarm display is made at step #302, and the motor (M) is reversed at step #303. Then, it is discriminated at step #304 whether or not the leading end of the film 8 has been wound around the spool 2. If wound, the spool 2 is stopped at a position of MRI the arrow 5 of the disk 3 points to at step #305 so as to terminate the operation. If it is decided at step #301 that the first perforation has passed the photoreflector PR3, the subsequent operations suspended due the execution of this program are executed.

Figure 32:
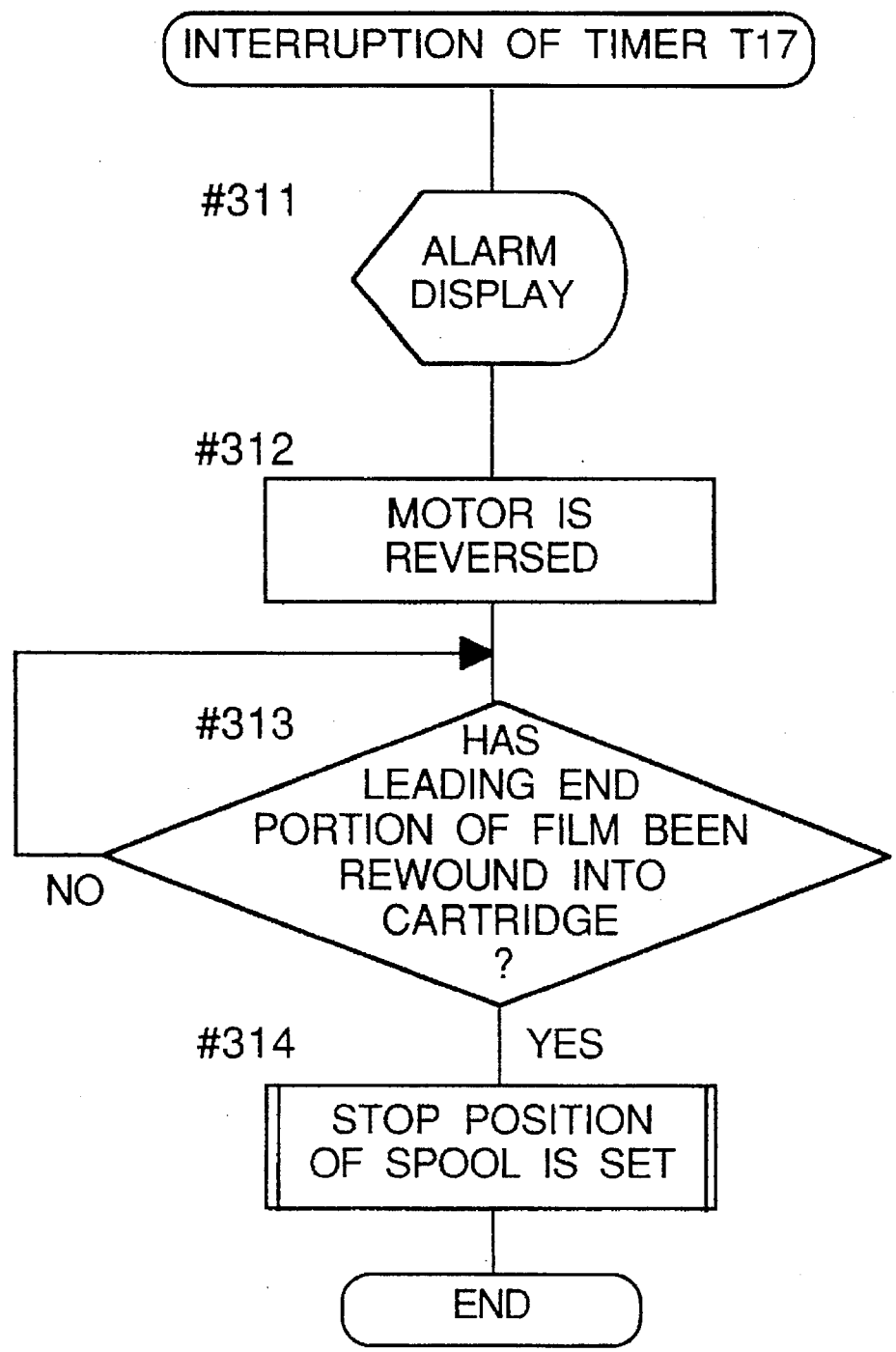
FIG. 32 is a flowchart showing an interruption by means of a timer.

An interruption by means of the timer T17 occurs when the data of the disk 3 has not been read after the timer T17 is set. The operation to be executed at this time is shown in FIG. 32. The interruption by means of the timer T17 is prohibited when the data of the disk 3 has been read in executing the subroutine of data reading which will be described later. Accordingly, this program is executed only when the data has not been read in 15 seconds after the timer T17 is set. Thus, in this flow, an alarm display is made at step #311, and the motor (M) is reversed at step #312. Then, it is discriminated at step #313 whether or not the leading end of the film has been wound around the spool 2. If wound, the spool 2 is stopped at a predetermined angle so as to terminate the operation.

Figure 33:
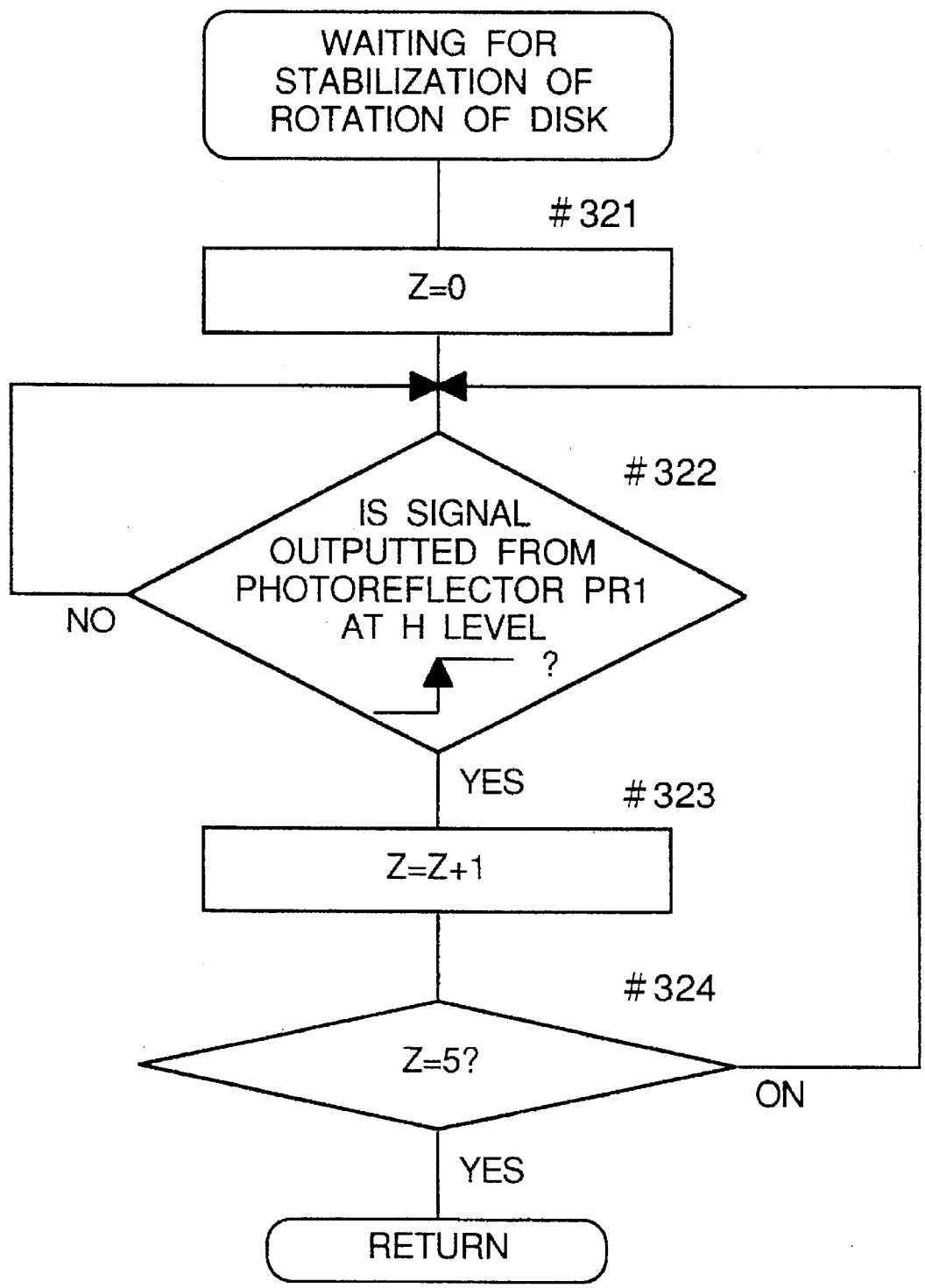
FIG. 33 is a modification of flowchart showing the operation of waiting for the stabilization of the data disk

The operation of waiting for the stabilization of the disk 3 described with reference to FIG. 13 may also be performed by the method shown by the flowchart of FIG. 33. In this case, it is unnecessary to provide the switch S4 as shown in FIGS. 5 and 14. In this flowchart, at step #321, Z (value indicating the number of changes in the level of the signal outputted from the photoreflector PR1) is set to 0. If it is decided that the level of the signal has changed five times at steps #322 through #324, it is decided that the rotation of the disk 3 has been stabilized.

Referring to FIGS. 34 through 38, description is made on the method for discriminating whether the width of the bar 6a and that of the space 6b are wide or narrow by using only one photoreflector for detecting the data of the disk 3, respectively. In this method, it is discriminated whether the bar 6a is wide or narrow ( or the space 6b is wide or narrow) by following such a procedure as calculating the difference in data-obtained from adjacent bars 6a or from adjacent spaces 6b and then comparing those data with threshold values set in advance. At step #331, 0 is substituted as an initial datum to be used for comparison. At step #332, the quiet zone 6d is searched as described previously with reference to FIG. 16. That is, it is detected whether or not the signal of H level outputted from the photoreflector PR1 is kept at H level for the time period of 60 ms after the timer is started. If kept at H level, it is decided that the quiet zone 6d has passed the photoreflector PR1; that is, if the space 6b has passed the photoreflector PR1, the signal outputted from the photoreflector PR1 is not kept at H level for the period of 60 ms.

Figure 34:
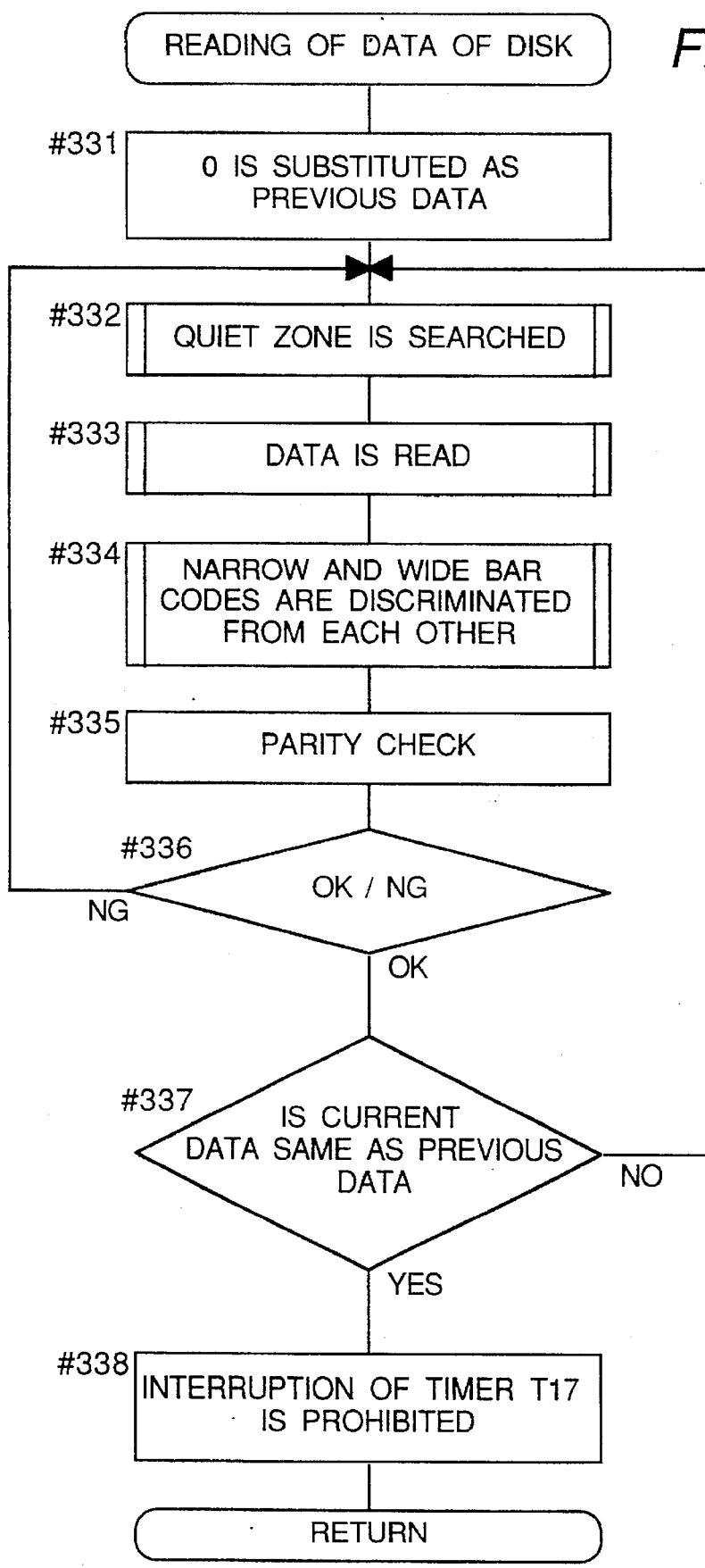
FIG. 34 is a modification of flowchart showing the operation of reading the data of the data disk.
Figure 35:
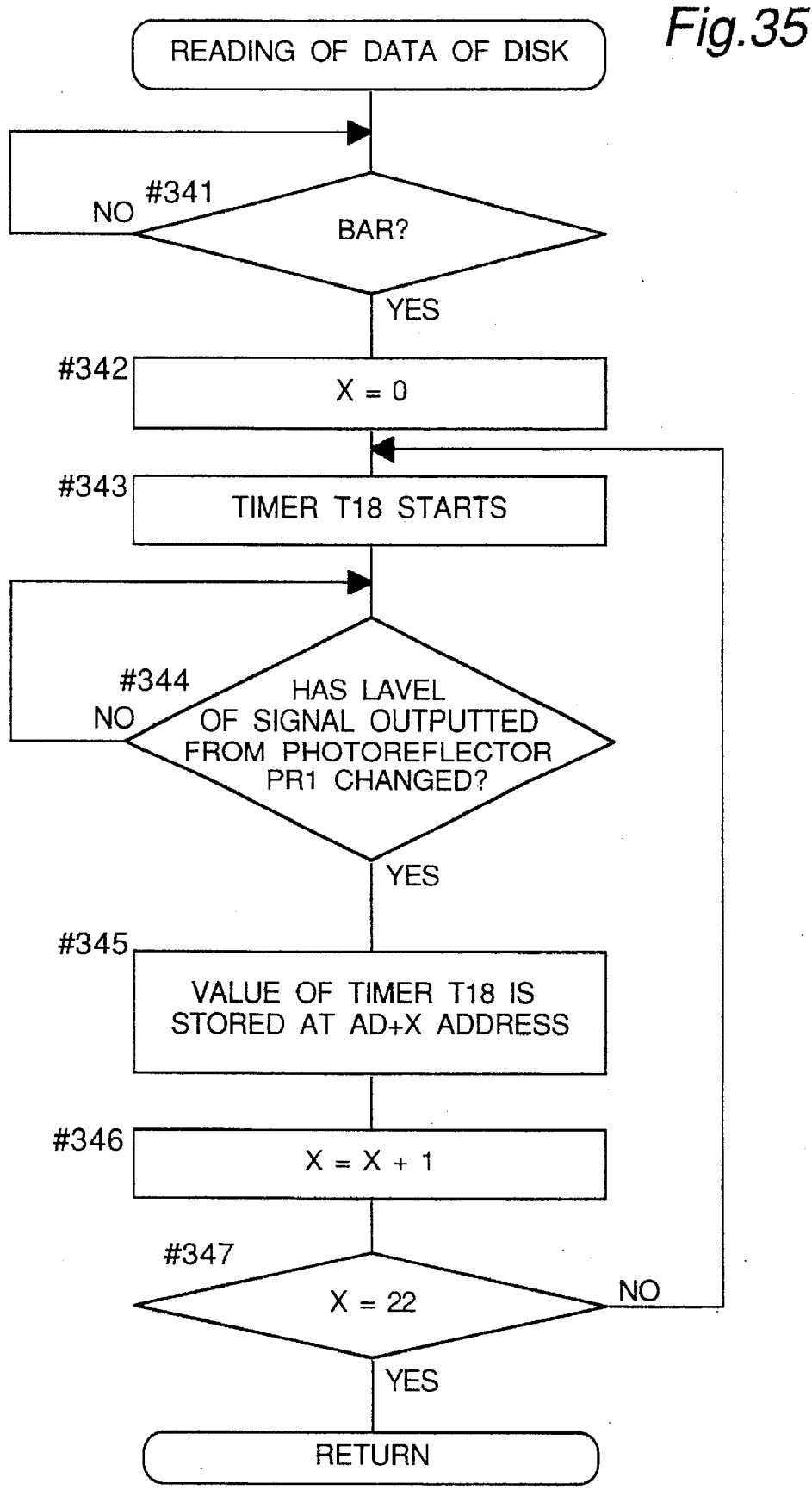
FIG. 35 is a flowchart showing the operation of reading the data of the data disk.
Figure 36:
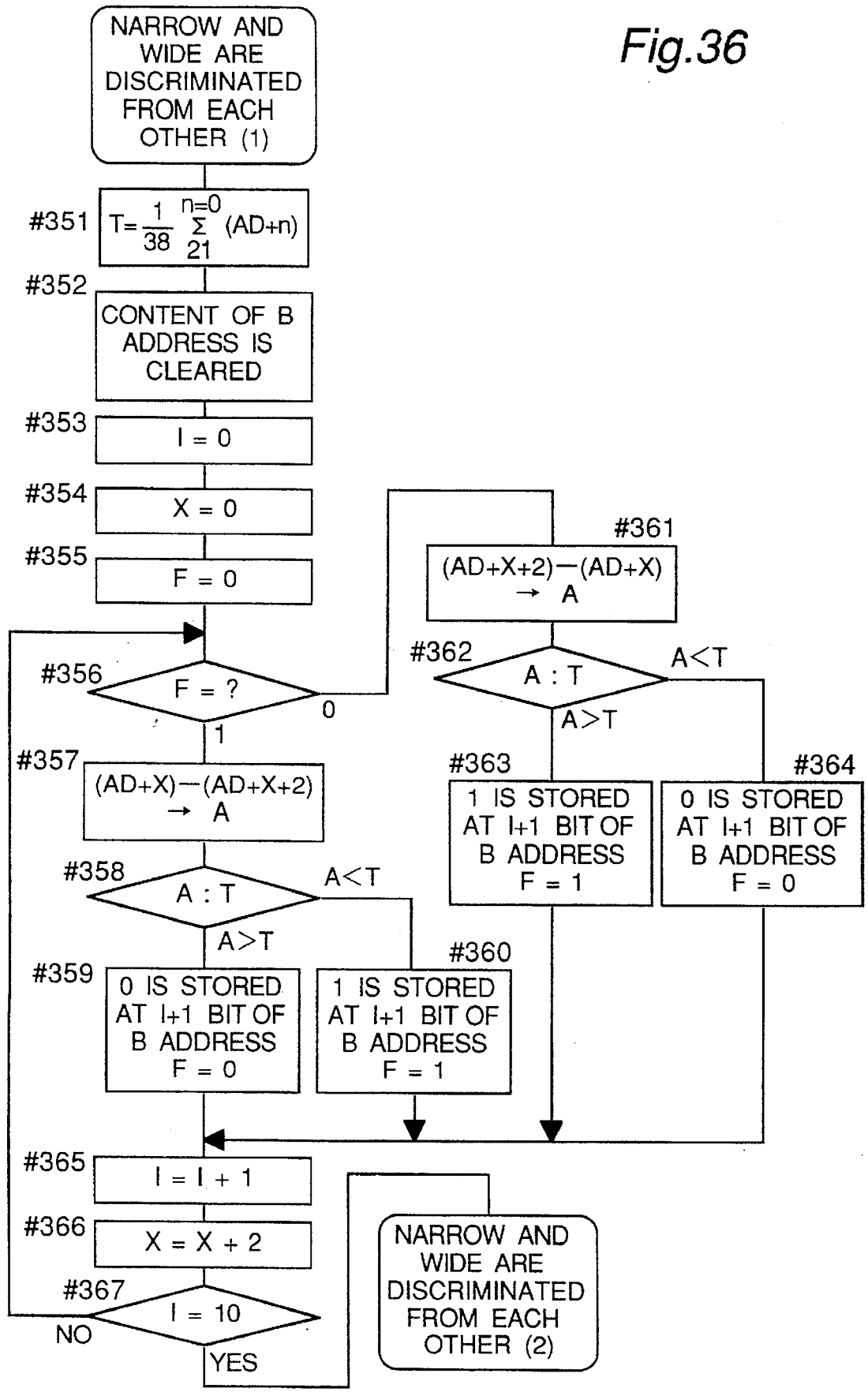
FIG. 36 is a flowchart showing an operation of discriminating narrow and wide bar codes from each other.

At step #333, the data of the disk 3 is read according to the flowchart of FIG. 35. First, at step #341, the passage of the first bar 6a adjacent to the quiet zone 6d by the photoreflector PR1 is waited. When the bar 6a is detected due to the change of the signal, from H level to L level, outputted from the photoreflector PR1, X indicating the number of loops from step #343 to step #346 is set to 0 at step #342. At step #343, a value-increase type of timer T18 is started. It is discriminated at step #344 whether or not the edge of the bar 6a and that of the space 6b have arrived at the photoreflector PR1 due to the level change of the signal. The time indicated by the timer T18 is stored in an AD address of the memory. At steps #346 and #347, the data of the bar 6a and that of the space 6b indicated by the timer are repeatedly stored in the memory until X becomes 21. That is, when X=1, the data of the space 6b is stored in (AD+1) address, and when X=2, the data of the subsequent bar 6a is stored in (AD+2) address. Finally, the data of the last space 6b is stored at (AD+21) address The wide and narrow bars 6a and spaces 6b are distinguished from each other at step #334 of FIG. 34 according to the flowchart of FIGS. 36 and 37. At step #351, a threshold T for distinguishing the wide and narrow bars 6a from each other is calculated from the data of the AD address to that of the (AD+21) address. Then, at step #352, the content of an B address of the memory for storing the data of the bar 6a is cleared. At step #353, the number of loops subsequent to step #356 is set to 0, and at step #354, X is set to 0 to use the data stored in AD-address through AD+21 addresses for comparison. At step #355, a flag F (set to 0 when the bar and space are narrow and set to 1 when they are wide.) for distinguishing the wide and narrow bars 6a from each other is set to 0. This is because the width of the first bar 6a whose time value is stored in the AD address of the memory is set to "narrow".

Thereafter, it is discriminated at step #356 whether or not the flag F has been set to 1 or 0. Since the width of the first bar 6a is set to "narrow" as described previously, the program goes to step #361 at which the time stored at an (AD+X) address (first address is AD address) is subtracted from the time of the subsequent bar 6a stored in an (AD+X+2) address. In this manner, the difference (A) between the data of adjacent addresses is found. It is discriminated at step #362 whether the difference (A) is greater or smaller than the threshold (T). If greater, at step #363, 1 is stored in (I+1) bit of the (B) address as the flag. If smaller, 0 is stored therein at step #364. Then, at step #365, 1 is added to I, and at step #366, 2 is added to X. Then, the operations of step #356 through step #367 are repeatedly executed until I becomes 10.

If it is decided at step #367 I has not become 10, the program returns to step #356 at which it is decided whether the flag F is set to 1 and the bar 6a is wide. If the flag F is set to 1 and the bar 6a is wide, the program goes to step #357 at which the datum stored in the (AD+X+2) address is subtracted from the datum of the subsequent bar 6a stored in the (AD+X) address. In this manner, the difference (A) between the data of adjacent addresses is found. It is detected at step #358 whether the difference (A) is greater than the threshold (T). If greater, at step #359, 0 is stored in (I+1) bit of the (B) address. If smaller, 1 is stored therein at #360. In this manner, after detecting the data of the width of the preceding bar 6a stored in an address of the memory, until I becomes 10, the corresponding data, as a flag, is stored sequentially in (I+1) bit 10 times in total. Therefore, the data corresponding to the width of each of the 10 bars 6a except the data of the width of the first bar 6a is stored as a flag in the (B) address of the memory.

Figure 37:
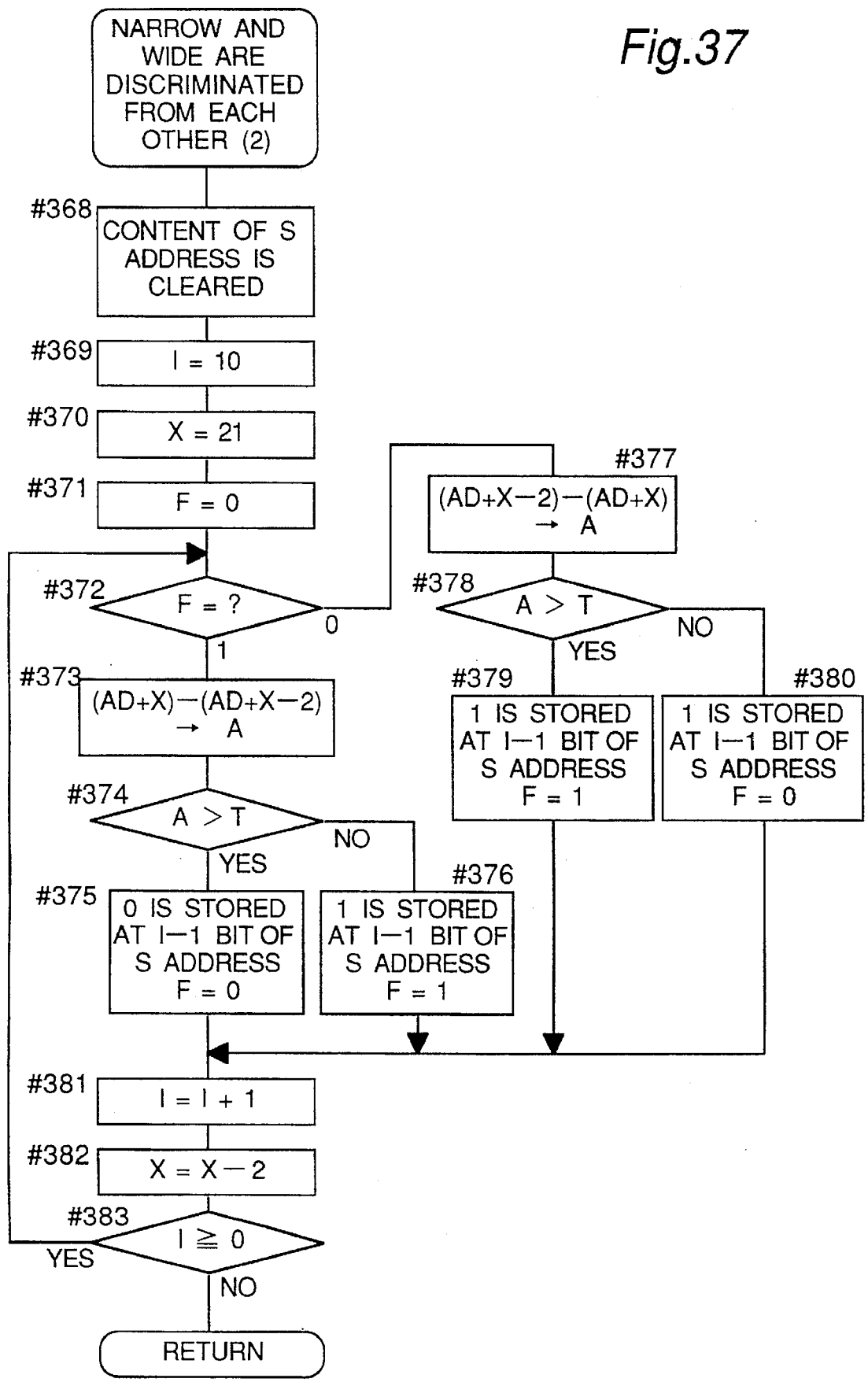
FIG. 37 is a flowchart showing an operation of discriminating narrow and wide bar codes from each other.

After the data of the bars 6a is stored, it is decided whether the space 6b is wide or narrow, and the data of the decision is stored as shown in the flowchart of FIG. 37. First, at step #368, the content of an (S) address of the memory is cleared to store the data of the space 6b. Then, at step #369, the number (I) of loops is set to 10. At step #370, X is set to 21 to use the data stored in AD address through AD+21 addresses for comparison. Then, at step #371, the flag F for distinguishing the narrow space 6b and the wide one 6b from each other is set to 0 because the last space 6b is set to the narrow width. Since the width of the last space 6b is known, the comparison of data (i.e. the ratio A to T) is carried out from the backwardness.

It is discriminated at step #372 whether or not the flag F is set to 1 or 0. As described previously, since the last space 6b is set to the narrow width, the program goes to step #377 at which the data stored in the (AD+X) address is subtracted from the data stored in the (AD+X–2) address (first is (AD+19) address). In this manner, the value of difference (A) between the data of adjacent addresses is found. It is detected at step #378 whether the value of difference (A) is greater or smaller than the threshold (T). If greater, at step #379, 1 is stored in the ninth bit of the (S) address as a flap showing the wide space 6b. If smaller, 0 is stored at #380. At steps #381, 1 is subtracted from I. At step #382, 2 is subtracted from X. Then, at step #383, it is decided whether or not I≧0. If I≧0, the operations of step #372 through step #383 are repeatedly executed.

If it is decided at step #372 that the flag F set in the previous loop has been set to 1 and the space 6b is wide, the program goes to step #373 at which the data stored in the (AD+X–2) address is subtracted from the data stored in the (AD+X) address. In this manner, the difference (A) between the data of adjacent addresses is found. It is detected at step #374 whether the value of difference (A) is greater of smaller than the threshold (T). If greater, at step #375, 0 is stored in the (I–1) bit of the S address. If smaller, 1 is stored at #376. In this manner, after detecting the data of the width of the preceding space 6b stored in an address of the memory, until I becomes 0, the corresponding data, as a flag, is stored sequentially in (I–1) bit 10 times in total. Therefore, the data corresponding to the width of each of the 10 space 6b except the data corresponding to the width of the last space 6b is stored as a flag in the (S) address of the memory.

At steps #357, #361, #373, and #377, the difference between the data of the adjacent addresses is taken and then compared with each other. This method allows the width of the bars 6a and that of the spaces 6b to be more accurately detected than the method of directly comparing the data of each bar 6a and space 6b with the threshold. That is, as shown in FIG. 38a, when a bar code signal is obtained and the threshold level of a comparator has fluctuated as shown in (1) and (2), resulting pulse durations are as shown in FIG. 38b and FIG. 38c. As shown in FIGS. 38b and 38c, if the data of adjacent bars 6a and spaces 6b are compared with the threshold, the pulse durations of FIG. 38b are different from those of FIG. 38c. As a result, there is a possibility that the bar 6a or the space 6b decided as the narrow one in FIG. 38b may be decided as the wide one in FIG. 38c or vice versa. But the difference between the data of the adjacent bars 6a or the adjacent spaces 6b is constant. That is, w–n is equal to w'–n', and W–N is equal to W'–N'. Therefore, whether the bar 6a or the space 6b is wide or narrow can be reliably discriminated by comparing the differences thereof in this way.

After the above-described decisions are made, parity checks are performed at steps #335, #336, and #337 of FIG. 34. If the result is OK and the same data is obtained twice continuously, the interruption operation of the timer T17 is prohibited at step #338. Then, the program goes to step #9 of FIG. 6. If it is decided at step #335 that the result of the parity check is NG and the same data is not obtained twice continuously in the check executed at step #337, the operation of step #332 and the operations of the subsequent steps are repeatedly executed. If the film 8 has been fed more than a predetermined length in the repeated execution of the operations, the interruption program INT1 is executed to rewind the film 8 and the stop position of the spool 2 is set. In this manner, the data of the disk 3 may be read, the film 8 may be rewound when an error has occurred in reading the data, and the stop position of the spool 2 may be set.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera using a cartridge that has a spool around which a film is wound and that has a display member rotating together with the spool for providing an exposed/unexposed indication for the film, the camera comprising:

a fork engaging and rotating together with the spool;

a motor for driving the fork, wherein the motor is supplied with electricity from a power supply;

a stop mechanism which stops the fork at a desired rotational position corresponding to an exposed/unexposed indication for the film; and a controller which controls said motor so that the rotational speed of the fork is maintained at a predetermined speed when the motor is actuated, so that the fork does not deviate from a desired rotational position corresponding to an exposed/unexposed indication for the film when the fork is stopped by the stop mechanism, wherein the predetermined speed of the fork is lower than the rotational speed thereof at which the film is rewound into the cartridge.

2. A camera as claimed in claim 1, further comprising:

a supply voltage detecting device which detects the voltage of the power supply, wherein the rotational speed of the fork is controlled, based upon the supply voltage detected by the supply voltage detecting device.

3. A camera as claimed in claim 2, further comprising:

a time detecting device which detects the time required to feed the film, wherein the supply voltage detecting device detects the supply voltage, based on information from the time detecting device.

4. A camera as claimed in claim 2, wherein the rotational speed of the motor is controlled by changing the pulse duration of a driving pulse produced from the controller.

5. A camera as claimed in claim 1, further comprising:

a rotational speed detecting device which detects the rotational speed of the spool, wherein the rotational speed of the fork is controlled by information from the rotational speed detecting device.

6. A camera using a cartridge that has a spool around which a film is wound and that has a display member rotating together with the spool for providing an exposed/unexposed indication for the film, the camera comprising:

a fork engaging and rotating together with the spool;

a motor, for driving the fork, having a rotational speed which is controlled by a driving pulse applied to the motor, wherein the motor is supplied with electricity from a power supply;

a stop mechanism which stops the fork at a desired rotational position corresponding to the exposed/unexposed indication for the film; and a controller which varies a duty ratio of the driving pulse applied to the motor in order to control the motor so that the rotational speed of the fork is maintained at a predetermined speed when the motor is actuated, so that the fork does not deviate from the desired rotational position corresponding to the exposed/unexposed indication for the film when the fork is stopped by the stop mechanism, wherein the predetermined speed of the fork is lower than the rotational speed thereof at which the film is rewound into the cartridge.

7. A camera as claimed in claim 6, further comprising:

a supply voltage detecting device which detects the voltage of the power supply, wherein the pulse duration of the driving pulse is controlled, based on the supply voltage detected by the supply voltage detecting device.

8. A camera as claimed in claim 7, further comprising:

a time detecting device which detects the time required to feed the film, wherein the supply voltage detecting device detects the supply voltage, based on information from the time detecting device.

9. A camera as claimed in claim 6, further comprising:

a rotational speed detecting device which detects the rotational speed of the spool, wherein the pulse duration of the driving pulse applied to the motor is controlled on the basis of information from the rotational speed detecting device.

10. A camera using a cartridge that has a spool around which a film is wound and that has a display member rotating together with the spool for providing an exposed/unexposed indication for the film, the camera comprising:

a fork engaging and rotating together with the spool;

a motor for driving the fork;

a power supply for supplying electricity to the motor;

a first drive controller which controls the motor so as to stop the fork at a desired rotational position corresponding to the exposed/unexposed indication for the film so that the fork does not deviate from the desired rotational position;

a second drive controller which rewinds the film into the cartridge; and a controller which differentiates a rotational speed of the fork controlled by the first drive controller from the rotational speed thereof controlled by the second drive controller.

11. A camera as claimed in claim 10, wherein the controller sets the rotational speed of the fork controlled by the second drive controller to be greater than the rotational speed thereof controlled by the first drive controller.

12. A camera as claimed in claim 10 wherein the first drive controller controls the motor by interrupting the supply of electricity to the motor, and wherein the second drive controller does not interrupt the supply of electricity to the motor during rewinding.

13. A camera using a cartridge that has a spool around which a film is wound and that has a display member rotating together with the spool for providing an exposed/unexposed indication for the film, the camera comprising:

a fork engaging and rotating together with the spool;

a motor for driving the fork, wherein the motor is supplied with electricity from a power supply;

a stop instruction mechanism which stops the motor at a predetermined timing so as to stop the fork at a desired rotational position corresponding to a display mark on the display member so that the display member provides an exposed/unexposed indication for the film;

a controller which controls the motor so that the rotational speed of the fork is kept constant at a predetermined speed when the fork is driven, so that the fork does not deviate from a desired rotational position corresponding to the exposed/unexposed indication for the film when the fork is stopped by the stop instruction mechanism, wherein the predetermined speed of the fork is lower than the rotational speed thereof at which the film is rewound into the cartridge; and a supply voltage detecting device which detects the voltage of the power supply, wherein the rotational speed of the fork is controlled to be kept constant at the predetermined speed, irrespective of the voltage detected by the supply voltage detecting device.

14. A camera as claimed in claim 13, further comprising:

a time detecting device which detects the time required to feed the film, wherein the supply voltage detecting device detects the supply voltage, based on information from the time detecting device.

15. A camera as claimed in claim 13, wherein the rotational speed of the motor is controlled by changing the duration of a driving pulse produced by the controller.

16. A camera using a cartridge that has a spool around which a film is wound and that has a display member rotating together with the spool for providing an exposed/unexposed indication for the film, the camera comprising:

a fork engaging and rotating together with the spool;

a motor for driving the fork, wherein the motor is supplied with electricity from a power supply;

a power supply for supplying electricity to the motor;

a stop instruction mechanism which stops the motor at a predetermined timing so as to stop the fork at a desired rotational position corresponding to a display mark on the display member so that the display member provides an exposed/unexposed indication for the film;

a controller which controls the motor so that the rotational speed of the fork is kept constant at a predetermined speed when the fork is driven, so that the fork does not deviate from a desired rotational position corresponding to the exposed/unexposed indication for the film when the fork is stopped by the stop instruction mechanism, wherein the predetermined speed of the fork is lower than the rotational speed thereof at which the film is rewound into the cartridge; and a rotational speed detecting device which detects the rotational speed of the spool, wherein the rotational speed of the spool is controlled, based on information from the rotational speed detecting device.

* * * * *